United States Patent
Pombo et al.

(10) Patent No.: US 7,930,215 B2
(45) Date of Patent: Apr. 19, 2011

(54) CONTEXTUAL COMPUTING SYSTEM

(75) Inventors: Alvaro Pombo, Ottawa (CA); Karim A. Sultan, Kanata (CA); Paul Haskins, Manotick (CA); Kevin H. McGuire, Kanata (CA); Adrian Zamfir, Kanata (CA)

(73) Assignee: TrueContext Corporation, Ottawa, Ontario (CA)

( * ) Notice: Subject to any disclaimer, the term of this patent is extended or adjusted under 35 U.S.C. 154(b) by 2293 days.

(21) Appl. No.: 10/631,623

(22) Filed: Jul. 31, 2003

(65) Prior Publication Data
US 2004/0054569 A1 Mar. 18, 2004

Related U.S. Application Data

(60) Provisional application No. 60/399,996, filed on Jul. 31, 2002.

(51) Int. Cl.
*G06Q 30/00* (2006.01)

(52) U.S. Cl. .......................................... 705/26; 705/37
(58) Field of Classification Search ................ 705/26, 705/37
See application file for complete search history.

(56) References Cited

U.S. PATENT DOCUMENTS

| | | | |
|---|---|---|---|
| 5,054,095 A | 10/1991 | Bernsen et al. | 382/30 |
| 5,054,096 A | 10/1991 | Beizer | 709/220 |
| 5,513,332 A | 4/1996 | Wimer et al. | 395/427 |
| 5,664,207 A | 9/1997 | Crumpler et al. | 395/766 |
| 5,675,743 A | 10/1997 | Mavity | 395/200.15 |
| 5,680,548 A | 10/1997 | Trugman | 395/200.09 |
| 5,801,689 A | 9/1998 | Huntsman | 345/329 |
| 5,812,857 A | 9/1998 | Nelson et al. | 395/712 |
| 5,819,274 A | 10/1998 | Jackson, Jr. | 707/10 |
| 5,884,317 A | 3/1999 | Cline et al. | 707/103 |
| 5,887,141 A | 3/1999 | Trugman | 395/200.57 |
| 5,892,900 A * | 4/1999 | Ginter et al. | 726/26 |
| 5,926,637 A | 7/1999 | Cline et al. | 395/701 |
| 5,937,198 A | 8/1999 | Nelson et al. | 395/712 |
| 5,949,412 A | 9/1999 | Huntsman | 345/329 |
| 5,960,421 A | 9/1999 | Cline et al. | 707/2 |
| 6,006,229 A | 12/1999 | Schmidt et al. | 707/10 |
| 6,006,277 A | 12/1999 | Talati et al. | 709/300 |
| 6,070,199 A | 5/2000 | Axtman et al. | 710/1 |

(Continued)

FOREIGN PATENT DOCUMENTS

WO WO97/43717 11/1997

(Continued)

OTHER PUBLICATIONS

Startup gets $5.4M boost: TrueContext seeks magic link between services, markets; [Final Edition], Bert Hill. The Ottawa Citizen. Ottawa, Ont.: Feb. 27, 2002. p. C.1.FRO, downloaded from ProQuest Direct on the Internet on Jan. 18, 2010, 3 pages.*

(Continued)

*Primary Examiner* — James Zurita
(74) *Attorney, Agent, or Firm* — Nixon Peabody LLP

(57) ABSTRACT

A contextual computing system allows a variety of actors to interact with system components to carry out computational and communication tasks. The system is provided as a self-contained and portable solution for communications needs, employable by a number of entities such as telecommunications companies, enterprises, and system operators. The computing system is implemented using layers, with components within the layers carrying out computational and communication tasks in response to input from actors. The system allows business logic and communication to be integrated into a single solution, providing for efficient communication and remarkable ease of use in a variety of possible deployments.

35 Claims, 27 Drawing Sheets

U.S. PATENT DOCUMENTS

| | | | |
|---|---|---|---|
| 6,115,744 A | 9/2000 | Robins et al. | 709/227 |
| 6,119,167 A | 9/2000 | Boyle et al. | 709/234 |
| 6,128,742 A | 10/2000 | Felt | 713/202 |
| 6,216,151 B1 | 4/2001 | Antoun | 709/203 |
| 6,230,190 B1 | 5/2001 | Edmonds et al. | 709/213 |
| 6,233,608 B1 | 5/2001 | Laursen et al. | 709/217 |
| 6,236,999 B1 | 5/2001 | Jacobs et al. | 707/10 |
| 6,243,676 B1 | 6/2001 | Witteman | 704/243 |
| 6,247,048 B1 | 6/2001 | Greer et al. | 709/219 |
| 6,253,257 B1 | 6/2001 | Dundon | 709/331 |
| 6,288,718 B1 | 9/2001 | Laursen et al. | 345/347 |
| 6,289,212 B1 | 9/2001 | Stein et al. | 455/412 |
| 6,292,657 B1 | 9/2001 | Laursen et al. | 455/411 |
| 6,292,833 B1 | 9/2001 | Liao et al. | 709/229 |
| 6,301,471 B1 | 10/2001 | Dahm et al. | 455/405 |
| 6,301,474 B1 | 10/2001 | Hartmaier et al. | 455/417 |
| 6,304,746 B1 | 10/2001 | Fascenda et al. | 455/31.3 |
| 6,304,753 B1 | 10/2001 | Hartmaier | 455/413 |
| 6,304,881 B1 | 10/2001 | Halim et al. | 707/201 |
| 6,314,108 B1 | 11/2001 | Ramasubramani et al. | 370/460 |
| 6,317,594 B1 | 11/2001 | Gossman et al. | 455/414 |
| 6,317,831 B1 | 11/2001 | King | 713/171 |
| 6,330,568 B1 | 12/2001 | Boothby et al. | 707/201 |
| 6,341,270 B1 | 1/2002 | Esposito et al. | 705/26 |
| 6,341,316 B1 | 1/2002 | Kloba et al. | 709/248 |
| 6,347,095 B1 | 2/2002 | Tang et al. | 370/469 |
| 6,353,839 B1 | 3/2002 | King et al. | 707/513 |
| 6,356,964 B1 | 3/2002 | Mohindra et al. | 710/100 |
| 6,360,252 B1 | 3/2002 | Rudy et al. | 709/206 |
| 6,360,279 B1 | 3/2002 | Woods et al. | 709/318 |
| 6,363,419 B1 | 3/2002 | Martin, Jr. et al. | 709/219 |
| 6,370,518 B1 | 4/2002 | Payne et al. | 707/1 |
| 6,385,643 B1 | 5/2002 | Jacobs et al. | 709/203 |
| 6,393,269 B1 | 5/2002 | Hartmaier et al. | 455/406 |
| 6,397,345 B1 | 5/2002 | Edmonds et al. | 714/4 |
| 6,400,754 B2 | 6/2002 | Fleming et al. | 375/140 |
| 6,405,037 B1 | 6/2002 | Rossmann | 455/426 |
| 2001/0041556 A1 | 11/2001 | Laursen et al. | 455/406 |
| 2001/0051979 A1 | 12/2001 | Aufricht et al. | 709/203 |
| 2002/0016813 A1 | 2/2002 | Woods et al. | 709/107 |
| 2002/0023173 A1 | 2/2002 | Jacobs et al. | 709/245 |
| 2002/0032722 A1 | 3/2002 | Baynes, Jr. et al. | 709/202 |
| 2002/0032750 A1 | 3/2002 | Kanefsky | 709/218 |
| 2002/0035605 A1 | 3/2002 | McDowell et al. | 709/206 |
| 2002/0035699 A1 | 3/2002 | Crosbie | 713/201 |
| 2002/0039882 A1 | 4/2002 | Ternullo et al. | |
| 2002/0039899 A1 | 4/2002 | Rossman | 455/426 |
| 2002/0042831 A1 | 4/2002 | Capone et al. | 709/230 |
| 2002/0046299 A1 | 4/2002 | Lefeber et al. | 709/318 |
| 2002/0049069 A1 | 4/2002 | Johnson | 455/528 |
| 2002/0049905 A1 | 4/2002 | Deo et al. | 713/170 |
| 2002/0052207 A1 | 5/2002 | Hunzinger | 455/456 |
| 2002/0052674 A1 | 5/2002 | Chang et al. | 700/300 |
| 2002/0052781 A1 | 5/2002 | Aufricht et al. | 705/14 |
| 2002/0052916 A1 | 5/2002 | Kloba et al. | 709/203 |
| 2002/0055917 A1 | 5/2002 | Muraca | 707/1 |
| 2002/0059256 A1 | 5/2002 | Halim et al. | 707/10 |
| 2002/0059459 A1 | 5/2002 | Koka et al. | 709/246 |
| 2002/0069263 A1 | 6/2002 | Sears et al. | 709/218 |
| 2002/0073163 A1 | 6/2002 | Churchill et al. | 709/214 |
| 2002/0073196 A1 | 6/2002 | Westervelt et al. | 709/224 |
| 2002/0114341 A1 | 8/2002 | Sutherland et al. | |
| 2002/0194219 A1 | 12/2002 | Bradley et al. | 715/506 |
| 2003/0032409 A1 | 2/2003 | Hutchenson | |
| 2003/0139174 A1 | 7/2003 | Rao | |
| 2003/0220879 A1 | 11/2003 | Gaughan et al. | 705/51 |
| 2004/0003341 A1 | 1/2004 | alSafadi et al. | |
| 2004/0128342 A1 | 7/2004 | Maes et al. | |

FOREIGN PATENT DOCUMENTS

| | | |
|---|---|---|
| WO | WO 97/43717 | 11/1997 |
| WO | WO 01/52496 | 7/2001 |
| WO | WO 01/61517 | 8/2001 |

OTHER PUBLICATIONS

Birgit Kreller, Siemens AG, Anthony Sang-Bum Park and Jens Meggers, Aachen University of Technology, Gunnar Forsgren, Ericsson Radio Systems AB Erno Kovacs and Michael Rosinus, Sony International (Europe)GMBH; UMTS: A Middleware Architecture and Mobile API Approach; Apr. 1998; pp. 32-38.

European Search Report for European Application No. 03766530.4 dated Dec. 10, 2008 (5 pages).

UMTS: A Middleware Architecture and Mobile API Approach, 7 pages, Birgit Kreller, Anthony Sang-Bum Park, Jens Meggers, Gunnar Forsgren, Erno Kovacs, Michael Rosinus, © 1998 IEEE.

International Search Report dated May 25, 2005.

International Search Report dated May 26, 2005.

International Search Report and Opinion dated Jun. 2, 2006.

"4[th]pass Delivers Free Java Bytecode Obfuscator to JavaLobby," Java Industry Connection™, java.sun.com, May 6, 1999, 2 pages.

4thpass Dynamic Provisioning, www.4thpass.com/solutions/index.html, Apr. 16, 2002, 16 pages.

Gutzman, Alexis, "The Who, What and Why of WAP," ecommerce-guide.com®, http://ecommerce.internet.com/news/insights/ectech/article/0..9561_381271.00.html, May 26, 2000, 4 pages.

IEC: Wireless Application Protocol (WAP), International Engineering Consortium, http://www.ieg.org/online/tutorials, copyright 2002, 10 pages.

Java Develper's Journal, http://www.sys-con.com, May 20, 2002, 4 pages.

Symbian Technology, http://www.symbian.com Mar. 2002, 39 pages.

TrueContext—collaboration for the wireless value chain, http://www.truecontext.com. Feb. 27, 2002, 28 pages.

Zuvix Tehcnology, http://211.174.63.103, May 20, 2002, 2 pages.

UMTS: A Middleware Architecture and Mobile API Approach, 7 pages, Birgit Kreller, Anthony Sang-Bum Park, Jens Meggers, Gunnar Forsgren, Erno Kovacs, Michael Rosinus, 1998 IEEE.

International Search Report, Application No. PCT/IB03/03045, dated Nov. 24, 2003, 4 pages.

* cited by examiner

TrueContext
collaboration for the wireless value chain

Main Options | myProfile | Users | Devices | Warehouse | Catalogs | Rules    Welcome Administrator Sample
*Sign Out

Maintain Users : Thane Eisener

Profile Details:
(◇ indicates a required field.)

- ◇ UserID: thane
- ◇ Name: ◇First: Thane  M.: J  ◇Last: Eisener
- Gender: –
- Age: Select Age Range
- Occupation: developer
- Company:
- Department:
- Preferred Language:
- Favorite Colour:
- Favorite Sport:
- Favorite Vehicle:

☑ Check here if we may contact you by e-mail?
☐ User is active:

e-mail(s):
| Other | teisener@truecontext.com | Add New e-mail |

Address(es):
| Work | Street: | Apt: | Add New Address |
|      | City:   | Prov./State: |
|      | Country: | Zip/P.Code: |

Phone Number(s):
| Work | ( 0 ) | Ext. | Add New Number |

Device(s):
| Model: lllxe | Device Name: kdaly | Add New Device |
| ☐ Remove Device |
| Model: m505 | Device Name: Thane's palm |

TrueContext  collaboration for the wireless value chain

Main Options | myProfile | Users | Devices | Warehouse | Catalogs | Rules     Welcome Administrator Sample
                                                                                         eSign Out

Maintain Warehouse

Find Item(s):
Keywords: [          ] [Search]

| Item Name | Ver. | # Binaries | Size | Last Updated | |
|---|---|---|---|---|---|
| ○ Air Hockey 3D Grayscale | 1.0 | 2 | 0 | 2002-04-12 | |
| ○ Air Hockey 3D Color | 1.0 | 2 | 0 | 2002-04-12 | |
| ○ Converter | 2.2 | 2 | 0 | 2002-04-12 | |
| ○ LoanHelper | 2.2 | 1 | 0 | 2002-04-12 | |
| ○ TipMe | 1.23 | 1 | 0 | 2002-04-15 | |
| ○ Big Clock | 1.0 | 1 | 0 | 2002-04-25 | |

[Delete Selected]

[Create New Item]

TrueContext
collaboration for the wireless value chain

Main Options | myProfile | myLibrary | Catalogs  
Welcome Sample User  
← Sign Out myProfile

Profile Details:
( ◊ indicates a required field.)

- ◊ UserID: user1
- ◊ Name: ◊First: Sample   M.   ◊Last: User
- Gender: F
- Age: 55+
- Occupation: tester
- Company: TrueContext
- Department: Verification
- Preferred Language: English
- Favorite Colour:
- Favorite Sport:
- Favorite Vehicle:

☑ Check here if we may contact you by e-mail?

Change Your Password:
New Password: _____  Confirm: _____

◊ e-mail(s): ← 318
Other | user1@TrueContext.com | Add New e-mail

Address(es):
Work | Street: 340 MacLaren | Apt.
City: Ottawa | Prov./State: Ontario
Country: Canada | Zip/P.Code: K1V 9Y8
Add New Address

Phone Number(s):
Work | ( 613 ) 233-8783 | Ext.
Add New Number

Device(s):
Model: IIIxe | Device Name: Lorraine | ☐ Remove Device | Add New Device
Model: Visor Prism | Device Name: A's palm | ☐ Remove Device

[ Save Changes ]   [ Cancel Changes ]

*Fig. 31*

| | | | | | | |
|---|---|---|---|---|---|---|
| Type: | Text | Priority: | Normal | | | |
| Subject: | Welcome New User! | | | | | |

Body:
Hi User1,
Welcome to the TrueContext Solution. Your account has been activated and you now have access to various catalogs.
Should you have any problems or questions about your account, please send an email to admin@company.com.

Thank you and we hope you enjoy your TrueContext Experience!

Select the Message Recipients
Results for all

356 →

| Send to Selected | Send the message to the selected users. | | | | |
|---|---|---|---|---|---|
| ☐ Select? | tc_sysop | 🔍 | ✗ | ✎ | 🖉 |
| ☐ Select? | tc_enduser | 🔍 | ✗ | ✎ | 🖉 |
| ☐ Select? | tc_supplier | 🔍 | ✗ | ✎ | 🖉 |
| ☐ Select? | tc_admin | 🔍 | ✗ | ✎ | 🖉 |
| ☐ Select? | anombo | 🔍 | ✗ | ✎ | 🖉 |

*Fig. 34*

CONTEXTUAL COMPUTING SYSTEM

CROSS-REFERENCE TO RELATED APPLICATION

This application claims the benefit of provisional application Ser. No. 60/399,996, filed Jul. 31, 2002.

FIELD OF THE INVENTION

The present invention relates generally to computer systems and more specifically to a computer administration system for the customization of information provision.

BACKGROUND OF THE INVENTION

The evolution of the mobile phone and the development of handheld computers with wireless data capabilities has given rise to new challenges for managing content and services for mobile devices. Mobile devices have constrained resources such as memory, storage, and battery life, requiring sophisticated management of content between devices, networks, and other storage devices. Within these limitations, individuals appreciate the ability to customize their devices by changing such features as screen backgrounds and ring tones and acquiring content such as music, games and applications, photos, and the like. Employees need the ability to provision for themselves the content they need to do their jobs while in the field, and consumers need simple mechanisms for sharing content they originate, such as photos, with their family and friends.

Consumers' and employees' needs for simplicity and intuitiveness of use requires the use of personalization and context-dependent techniques in the delivery of content and services. The limited interaction, display, and bandwidth capabilities of mobile devices require techniques for filtering and personalization of content to end-users to avoid the frustrating and lengthy process of searching for relevant information. The process of acquiring suitable or optimized content for end-users such as consumers and employees is further complicated by the existence of diverse device styles, functions, form factors, interaction methods, software platforms, and capabilities. In addition, varying, intermittent, and simultaneous availability of differing network technologies (e.g., 2G, 2.5G, 3G, infrared, Bluetooth, wireless LAN, USB, etc.) having different costs, bandwidths, and qualities of service complicates the delivery of digital content and services and requires the use of technologies such as synchronization to ensure that content and services on intermittently connected devices are complete and up-to-date.

Other factors influence the difficulty of provisioning digital content and services to end-users. For example, the increasing complexity of wireless applications and data, the variety of media types, multiple content versions, competing digital rights mechanisms, and differing validation, certification, and ratings methods make it difficult to choose which items are suitable for which devices.

Mobile network operators increasingly have a stake in the administration of mobile devices in order to ensure the availability of their networks and users' abilities to make phone calls. Further, mobile network operators are involved in the flow of information between enterprises and enterprises' mobile workers, and operators must evolve new services to support and protect enterprises and enterprise assets.

The communications industry has seen incredible innovation in recent years. Many new modes of communication and content formats have been developed, allowing users access to information in increasingly complex and useful ways. At the same time, the process of communication has become disjointed, with several sources of information, such as telephones, fax machines, computers, and mobile devices, competing for users' attention, with little focus on the development of solutions that assure that the most relevant information is provided to users at the most opportune times.

Current approaches to the targeting, personalization, provisioning and management of mobile content and services have led to dissatisfaction among individual users, who find it difficult to receive data organized to fit their individual needs. In turn, communications providers face the loss of customers through "churn," because current communications systems make it very difficult for providers to differentiate themselves from competitors based on ease-of-use and the pertinence and quality of delivered data.

As both end-users and system administrators deal with the complexities of emerging communication technologies, there exists a need for a comprehensive, easy-to-use system enabling the management and provisioning of digital content to a wide variety of different devices.

SUMMARY OF THE INVENTION

According to one embodiment of the present invention, a computing system is provided which allows for delivery of relevant content to system users.

According to another embodiment of the present invention, a complete communications solution is provided, allowing for a variety of communications providers, such as telecommunications providers and enterprises, to implement communications throughout a system in a highly customizable manner.

According to still another embodiment of the present invention, a computing system is implemented using a layer methodology, with components within layers providing features to a variety of actor types within the computing system, such that actors have access to the tools they need to perform computing and communication tasks.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

FIG. 16 is a screen view of a device detail page according to one embodiment of the present invention;

FIG. 18 is a screen view of a device deletion page according to one embodiment of the present invention;

FIG. 21 is a screen view of a rule selection page according to one embodiment of the present invention;

FIG. 22 is a screen view of a ruleset creation page according to one embodiment of the present invention;

FIG. 26 is a screen view of a user maintenance page according to one embodiment of the present invention;

FIG. 27 is a screen view of a user profile page according to one embodiment of the present invention;

FIG. 28 is a screen view of a warehouse maintenance page according to one embodiment of the present invention;

FIG. 29 is a screen view of a warehouse item details page according to one embodiment of the present invention;

FIG. 31 is a screen view of an end-user profile page according to one embodiment of the present invention;

FIG. 34 is a screen view of a message page according to one embodiment of the present invention.

Figure 1:
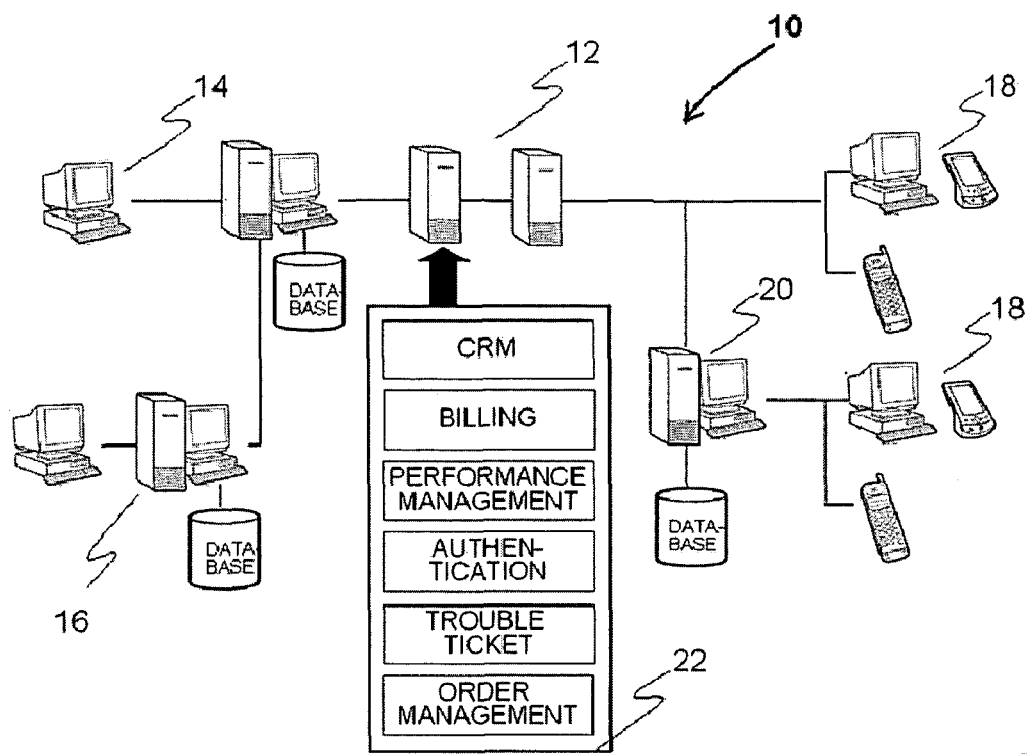
FIG. 1 is an architectural overview showing a computing system according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

The computing system of the present invention is directed to providing an easy-to-use, scalable, and integrated solution to those in need of a comprehensive approach to managing the provisioning of multiple types of information to multiple types of devices. FIG. 1 is an architectural overview of a computing system 10 according to one embodiment of the present invention. The computing system 10 of the present invention is distributed among many components and enables the interaction of a number of types of actors. Actors shown in FIG. 1 include service providers 12 which serve as central actors enabling the useful interaction of other actors such as content developers 14 and catalog aggregators 16, who create and organize data, and end-users 18 and enterprises 20 who make use of the data and may also perform data creation roles. Other actor types may access or provide content to the computing system 10, including ratings agents, validation agents, wholesalers, retailers, advertisers, and payment servers.

As shown in FIG. 1, the computing system 10 enables the use of multiple types of hardware as needed by each actor, including computers, servers, database storage devices, mobile devices, and mobile phones. As shown by the "integrators" block 22, the computing system 10 according to the present invention allows for the provision of several integrators, or features which allow for seamless functionality for different operations, such as billing, performance management, user authentication, trouble ticket generation and resolution, order management, and customer relationship management (CRM). Thus, for example, a service provider 12 using the computing system 10 has a number of integrator tools available to enhance the experience of an end-user or enterprise beyond provision of high-quality service, including the more intangible aspects of customer relationship management and resolution of customer concerns. As shown in FIG. 1, the present invention contemplates the provision of services directly from a service provider 12 to an end user 18, from a service provider 12 to an enterprise 20, and from the enterprise 20 to end-users 18 within the enterprise.

Figure 2:
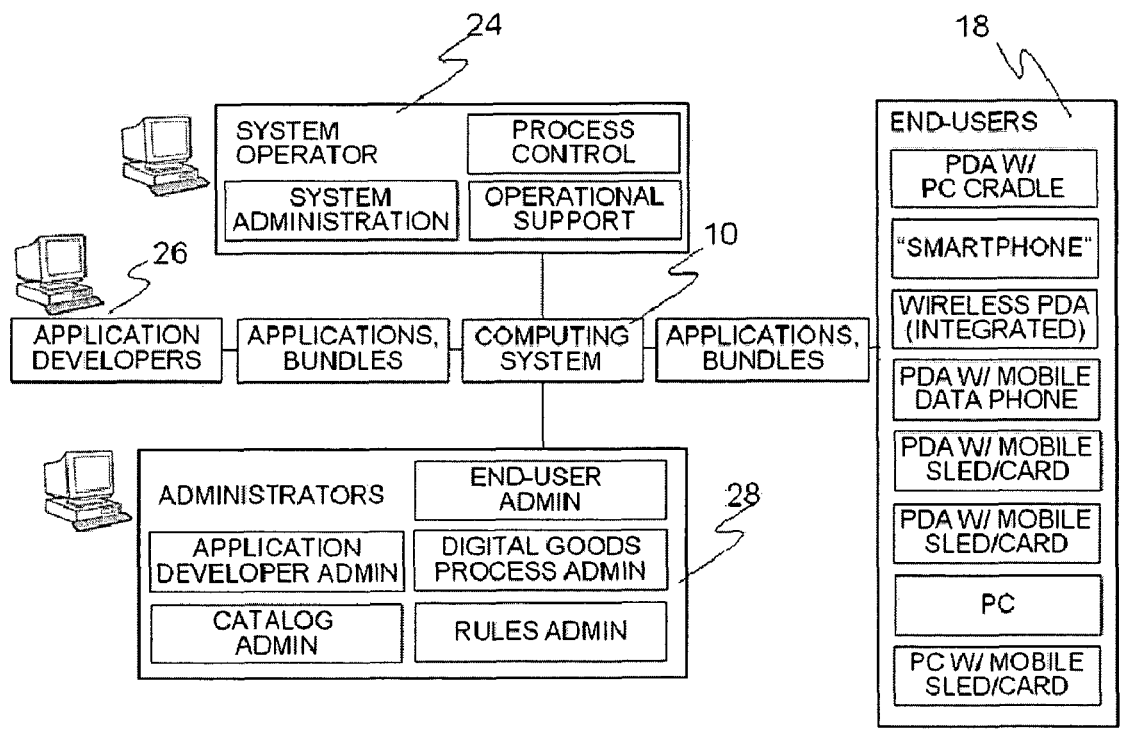
FIG. 2 is an architectural view showing the interactions between actors according to one embodiment of the present invention.

Turning now to FIG. 2, an architecture actors diagram shows the more general classifications into which actors using the computing system 10 of the present invention are grouped. In addition to the end-users 18, actors are classified into system operators 24, application developers 26, and administrators 28. Each of the actor types may include several types of individuals or entities, and each actor type fulfills certain functions using the computing system 10.

System operators 24 may include service providers 12, application service providers, or enterprises 20. System operators 24 perform the general functions of system administration, process control, and operational support. Examples of system operators include companies such as mobile network operators, managed service providers, application service providers, digital goods retailers, and enterprise service providers. Application developers 26 may include software developers, content aggregators and developers, and catalogs, and serve to provide content to administrators and/or system operators. Examples of content developers include independent software vendors, eBook publishers, Java application developers, ring tone creators, photographic publishers, game creators, and text message authors. Administrators 28 may include a variety of types of administrators, including application developer administrators, catalog administrators, end-user administrators, digital goods process administrators, and rules administrators, located at enterprises 20 or at service providers 12 serving as enterprises 20. Examples of administrators include system operators, network operations center (NOC) staff, chief information officers, IT services managers, help desk administrators, and service provisioning administrators. Administrators are in charge of content, including catalogs, rules, users, application developers, and marketing management. End-users 18 may include general use end-users and enterprise employees as end-users, and they use devices to access content such as data and applications using the computing system 10. The computing system 10 may be divided into "domains" for certain implementations, with administrator activities taking place within an administrator domain and system operations taking place within a system operator domain.

According to one embodiment of the computing system 10, end-users 18 use devices to communicate with other components of the computing system 10 via synchronization events during which data flows between end-users' devices and other components of the computing system 10. Synchronization events include such events as wired synchronizations, such as synchronization of a mobile device using a cradle or synchronization of a wired computer, and wireless synchronization of wireless devices or computers using a wireless networking system. While FIG. 2 shows the computing system 10 as an individual component to which other actors are connected, it is to be understood that the computing system 10 may be implemented as a distributed system, removing the need for a centralized location for every system component. It is preferred to implement the computing system 10 using a distributed architecture in which each actor is provided with the components it needs to complete its tasks, and is not burdened with additional complexities that are unrelated to the actor's goals. Further, the connection lines shown in FIG. 2 include wired and wireless means for distributing content, such as applications and data bundles, among the actors.

Figure 3:
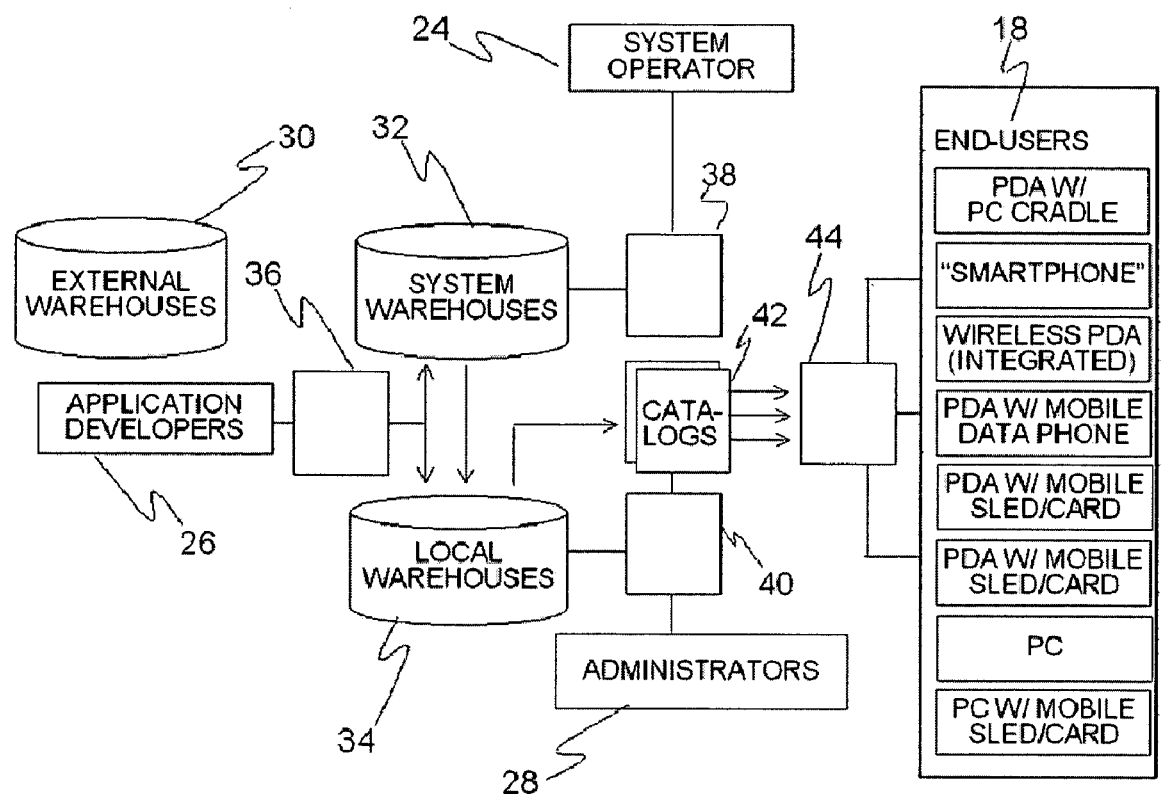
FIG. 3 is an architecture model showing the implementation of data storage and viewing according to one embodiment of the present invention.

The computing system 10 of the present invention enables the use of several types of content on a device-agnostic basis, allowing users maximum flexibility in accessing the content they require. FIG. 3 is an architecture diagram showing the interaction of actors, views, and data warehouses according to one embodiment of the present invention. The arrows and lines of FIG. 3 represent pathways for movement of content between data sources and actors. External warehouses 30 serve as outside data storage areas, with data from the external warehouses 30 being forwarded to a system warehouse 32 and a local warehouse 34 when necessary for a particular implementation of the computing system 10. Application developers 26 have access to information at the system warehouse 32 and the local warehouse 34 through the use of an application developer view 36, and may use the application developer view 36 to add content to the system warehouse 32 and the local warehouse 34.

Similarly, a system operator 24 has access to the system warehouse 32 using a system warehouse view 38, through which the system operator 24 can monitor and alter system settings. The system warehouse view 38 may include an entitlement warehouse view, indicating which users are entitled to which digital goods without requiring that the digital goods be stored within the computing system 10. An administrator 28 may access information at the local warehouse 34 via an administrator view 40, and may use the administrator view 40 to build catalogs 42. Catalogs represent views of digital items contained in the local warehouse 34 and represented by catalog items. A catalog is thus the standard mechanism for users to browse warehouse items, or digital goods, in the computing system 10. In addition to being created and managed by administrators, catalogs 42 may be assembled automatically and directly from content at the local warehouse 34. Catalogs 42 may be accompanied by meta-catalogs, serving as overarching collections of suitable individual catalogs. The administrator view 40 allows administrators 28 to create catalogs 42 and to monitor the use of catalogs 42 by end users 18. The end-users 18 have access to the catalogs 42 through catalog views 44. According to one embodiment of the computing system 10, end-users 18 are given the opportunity to create end-user catalogs of items to which the end-user is entitled, and an end-user catalog may further contain items which the end-user wishes to allow other end-users to access.

As shown by the divisions 45 of the architecture of FIG. 3, a single deployment of the computing system 10 may incorporate several different domains which make use of a single system warehouse 32 and are all controlled by a single system operator 24, while allowing distribution of domain-level decisions among domain administrators. Thus, multiple administrators or accounts with administrator privileges may be provided in a single deployment of the computing system 10. In such a deployment, parameters of the computing system 10—for example within the configuration component, described below—may impact multiple domains, or they may be specific to each domain, with one instance of a parameter for each domain.

Figure 4:
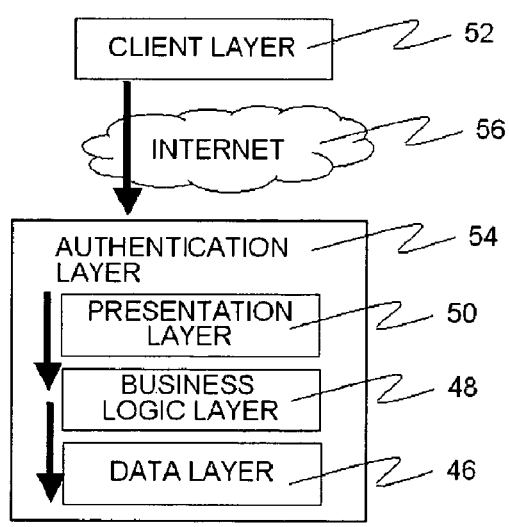
FIG. 4 is a layer view showing the separation of layers according to one embodiment of the present invention.

The computing system 10 of the present invention is preferably implemented using a layered architecture as shown in FIG. 4. According to one embodiment of the present invention, the computing system 10 contains four layers: a data layer 46, a business logic layer 48, a presentation layer 50, and a client layer 52. The data layer 46, business logic layer 48, and presentation layer 50 may be grouped into an authentication layer 54, indicating that for security purposes any access to these layers may only occur via an authenticated transaction. As indicated by the arrows of FIG. 4, each layer has an interface to its bordering layer or layers. According to the embodiment shown in FIG. 4, communications between the client layer 52 and the presentation layer 50 take place over the Internet 56, though it is to be understood that communications between the client layer 52 and the presentation layer 50 may be carried out without requiring the transfer of data over the Internet 56. As will be explained in more detail below, additional layers may be incorporated into the computing system 10 to enable additional functionality as desired, depending on particular deployments of the computing system 10. The features and functions of each of these layers will now be described. A more detailed depiction of the layer-based architecture of the computing system 10 is shown in FIG. 5, and FIGS. 6-8 show individual layers and interactions between the layers in greater detail.

Figure 6:
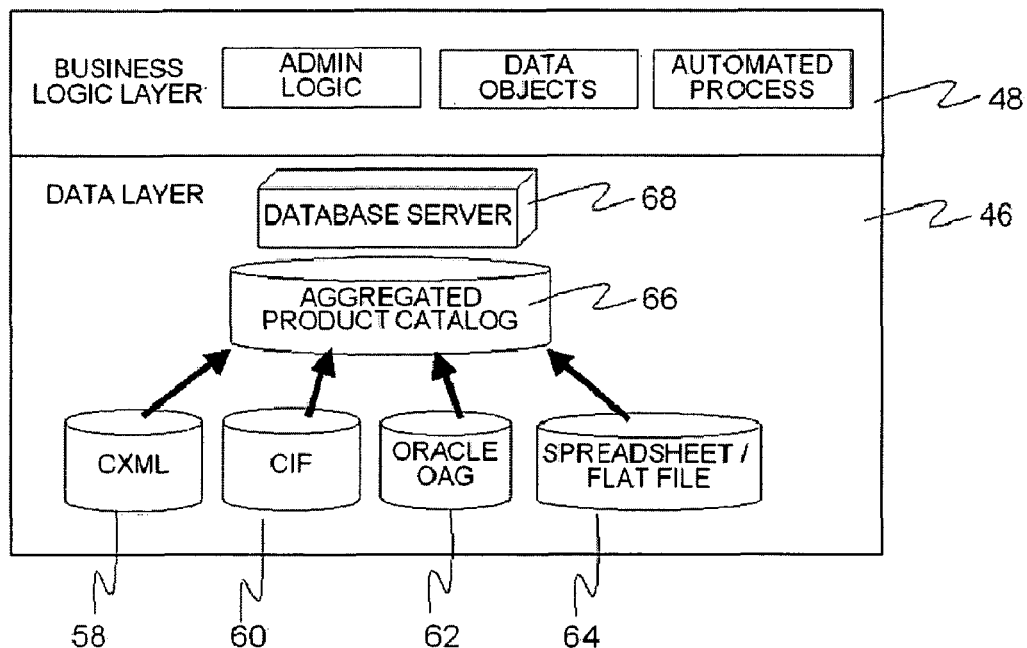
FIG. 6 is an architectural view of a data layer and a business logic layer according to one embodiment of the present invention.

The data layer 46 provides all data store services to the business logic layer 48 in a robust environment. The data layer 46 serves to abstract the actual composition of data in the computing system 10, with a data access component of the business logic layer 48 serving to store and retrieve data from the data layer 46. Within the data layer, data is preferably represented using a relational schema. According to one embodiment of the present invention, all data is represented using Extensible Markup Language (XML), with components in the business logic layer 46 able to access and manipulate the data regardless of the format of the data. Thus, different database servers may be deployed depending on the particular requirements of individual customers, as shown in FIG. 6. FIG. 6 shows that data from a number of different data formats, including, for example, data in Commerce Extensible Markup Language (CXML) 58, Common Interchange Format (CIF) 60, Oracle Open Applications Group (OAG) 62 databases, and spreadsheet/flat file data 64. Data from each of these and other sources may be integrated into an aggregated product catalog 66, accessible using a database server 68. The aggregated product catalog 66 provides persistent data storage, and the database server 68 provides data management services and clustering. The data layer 46 may employ a Java Database Connectivity (JDBC) bridge so that it can be used with any JDBC compliant database, including the data formats shown in FIG. 6.

Figure 5:
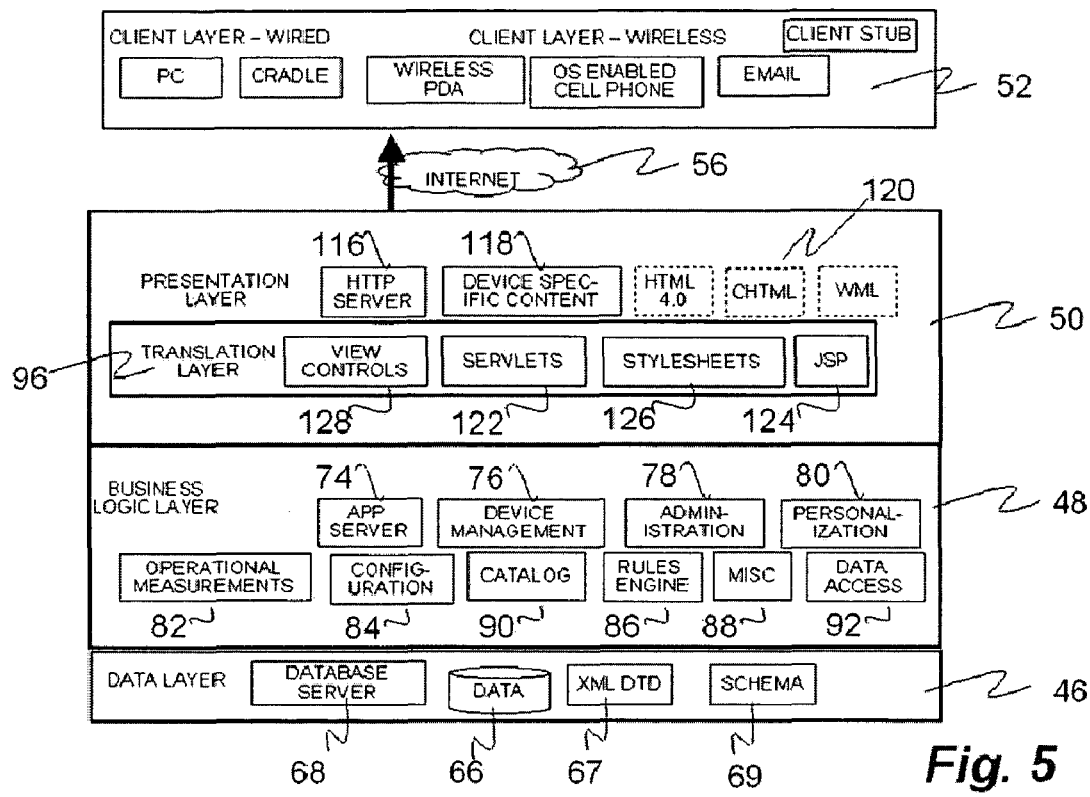
FIG. 5 is a more comprehensive architectural view showing layers and components within a computing system according to one embodiment of the present invention.

Data stored in the data layer 46 includes profile data for all actors in the computing system 10, rules definitions for all actors and entities in the computing system 10 (described in further detail below), catalog content for all aggregations and meta-catalogs, operational measurements, including statistical data for report generation on various aspects of the computing system 10, component configuration information for proper tuning of components of the computing system 10, and logs for tracking and review of system data and error handling. According to one embodiment of the present invention, the data layer 46 allows for Structured Query Language (SQL) access to data, supports XML representation of data, and enables the use of several interchangeable databases and data storage formats. Further, data objects can be used to provide an application program interface (API), and data may be mirrored. As shown in FIG. 5, the data layer 46 uses XML Document Type Definitions (DTDs) 67 combined with a proper database schema 69 to enable access to and proper formatting of data in the aggregated product catalog or database 66.

As shown in FIG. 6, the business logic layer 48 interacts with the data layer primarily through the use of administration logic, data objects, and automated processes. The business logic layer 48 serves as a bridge between the data layer 46 and the presentation layer 50, and it incorporates the application logic of the computing system 10. Logic may be represented as Enterprise Java Beans (EJB) within EJB containers, where required. According to one embodiment, the business logic layer 48 uses an object-based approach to compartmentalize the operating logic of the computer system 10. The business logic layer 48 performs actions, but does not generate views relating to those actions—the generation of views is delegated to the presentation layer 50. According to one embodiment of the present invention, the business logic layer 48 is only accessible via the presentation layer 50 and not directly from the client layer 52. This provides an additional element of security, so that the exposed Java Bean methods cannot be used maliciously. Further, each Java Bean in the business logic layer 48 can expose an application program interface (API) of a public method to developers at the presentation layer 50, allowing extensible customization of the presentation layer 50 based on existing components in the business logic layer 48.

Figure 7:
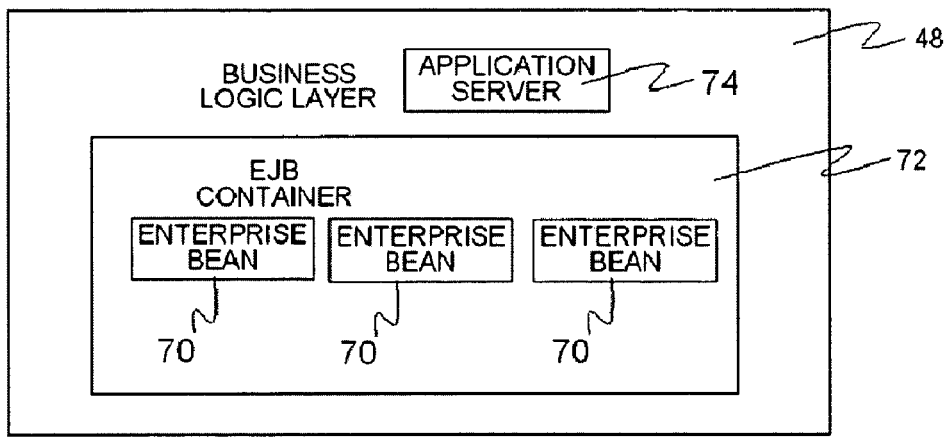
FIG. 7 is an architectural view of a business logic layer according to one embodiment of the present invention.

As shown in FIG. 7, an Enterprise Java Bean (EJB) approach to implementing the business logic layer 48 allows critical business logic to be assembled into several portable beans 70 that reside within an EJB container 72. Using this methodology, each bean 70 exposes an API that fulfills its business intent. The exposed API, in turn, can be accessed from other objects, as well as from the presentation layer 50. Objects for presentations, business logic, and data manipulation may all be incorporated into the business logic layer 48.

Referring back to FIG. 5, components contained within the business logic layer 48 include: an application server 74 which provides the EJB container 72, and allows for load balancing and clustering; a device management component 76, which allows management of end-users' OS enabled devices; an administration component 78 permitting administration of business objects; a personalization component 80 allowing for the personalization of the user experience and profile management; an operational measurement component 82 gathering system metrics for multiple aspects of the computing system 10 and providing statistical information for report generation; a configuration component 84 allowing for customization and tuning of system configurations for deployments of the computing system 10; a rules engine 86 allowing for event-driven business object control; a "miscellaneous" component 88, which may be a collection of versatile components including logging components and XML utilities; a catalog component 90 allowing for content aggregation and administration; and a data access component 92 enabling generic manipulation of data from the data layer 46. The business logic layer preferably uses extensible and scalable architecture with cross-platform capabilities.

Figure 8:
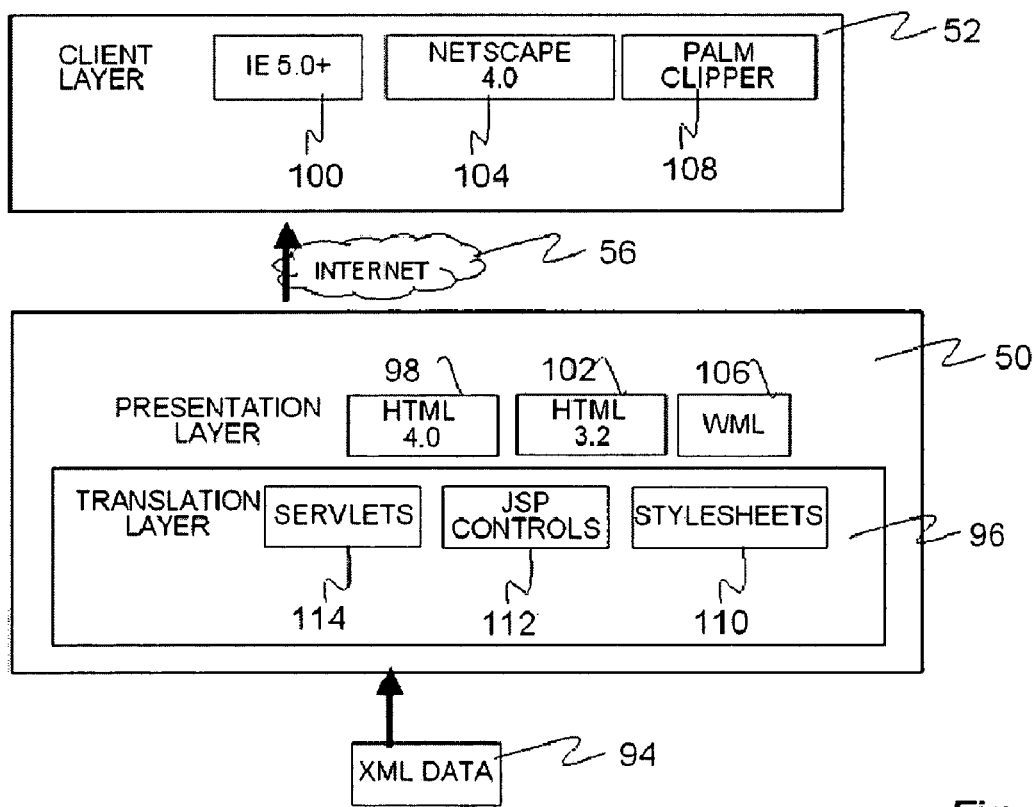
FIG. 8 is an architectural view showing the interaction of presentation and client layers according to one embodiment of the present invention.

Turning now to FIG. 8, a diagram of data flow and components within the presentation layer 50 is shown. The presentation layer 50 receives XML data from the business logic layer 48 and delivers the content to end-users 18. The presentation layer 50 is designed to be device-agnostic. That is, the presentation layer 50 is preferably capable of forwarding to the client layer 52 properly-formatted data that is ready for display on any type of device, including computers, mobile phones, and personal digital assistants (PDAs), utilizing a variety of browser types such as full-featured PC browsers, compact HTML (cHTML), and wireless markup language (WML). The end-user content may be custom-rendered depending on the device used to view the content. According to one embodiment of the presentation layer, views presented to the end-user are highly customizable, allowing the use of "skins" or presentation means that appeal to individual end-users or that are custom-selected by enterprises, for example, in a re-branding or co-branding deployment of the computing system 10. Further, communication between the presentation layer 50 and the client layer 52 is preferably designed for easy delivery through firewalls. The presentation layer 50 is preferably implemented using a Java Server Pages (JSP) methodology.

A translation layer 96 serves as a sub-layer of the presentation layer 50, and is responsible for accepting XML data 94 from the business logic layer 48 and translating it into an acceptable format for the target device at the client layer 52. It is preferable to implement a management function in the presentation layer 50 which acts in concert with Extensible Stylesheet Language (XSL) style sheets that serve to customize content presentation in real time.

To achieve a customizable look and feel for the presentation of content, the presentation layer 50 may be designed for maximum flexibility under control of a system operator's user interface team. Support for real-time changes and modifications is preferably provided in the presentation layer 50 to allow for similar content to be rendered in multiple manners, depending on the desired look and feel of the target device at the client layer 52. For example, information retrieved from a data catalog about an application may be enhanced using an HTML 4.0 translator 98 for Internet Explorer browsers 100, presented using an HTML 3.2 translator 102 for Netscape 4.x browsers 104, or simplified using a Wireless Markup Language (WML) translator 106 for rendering on a WML browser such as Palm Clipper 108. As described above, the Internet 56 is the preferred method of communication between the presentation layer 50 and the client layer 52.

Control of output rendering from the presentation layer 50 is preferably managed through the use of style sheets 110, requiring limited programming knowledge by a user interface team. Java Server Pages (JSP) may be used to access content in the business logic layer 48, providing the logical scripting aspects of the content. The use of style sheets 110 in the translation layer 96 further allows for rapid cosmetic changes to be made to the views available at the client layer 52, with such changes being available dynamically without interruption in service, recompilation of code, or unwanted downtime. This implementation of the translation layer 96 allows the business logic layer 48 to remain independent and insulated from presentation changes. A combination of JSP controls 112 and servlets 114 further enables the functionality of the translation layer 96.

Referring back to FIG. 5, the presentation layer 50 includes an HTTP server 116 which serves content and provides an HTTP access point to the client layer 52. Device-specific content 118 may be incorporated into the presentation layer 50, along with modules 120 for presenting data in a variety of markup languages. The presentation layer 50 further may include a servlet container 122 for providing access to servlet logic, a JSP interpreter 124 enabling server-side parsing and execution of JSP scripts located on the HTTP server 116, and stylesheets 126 describing the method of rendering raw XML data for specific views at the client layer 52. View controls 128 are also included in the presentation layer 50 to enable server-side manipulation of views by administrators.

The client layer 52 provides the access point to the computing system 10, and supports personalization via a web-accessible user interface and device management via a synchronization event. As shown in FIG. 5, the client layer 52 may include several types of wired and wireless devices that interact with the presentation layer 50, including PCs, cradled PDAs, wireless Palm-style PDAs, operating system-enabled mobile phones, and mobile email devices.

According to one embodiment of the client layer 52, a personalization feature is implemented by a user connecting to a web interface and accessing the personalization services via a device's browser. End-users 18 wishing to personalize their experiences with the computing system 10 then select administrative actions, allowing the end-users 18 to predetermine which actions will occur on their devices on the next synchronization with the presentation layer 50.

Device management at the client layer 52 involves both data management and device auditing. Data management at the client layer 52 includes updating, backing up, restoring, installing, and removing applications from an end-user's device. Device auditing involves retrieval of system metrics pertaining to an end-user's device. According to one embodiment of the present invention, device management occurs when an end-user 18 performs a synchronization event, such as wirelessly synchronizing with the presentation layer 50, or synchronizing a PDA using the PDA's cradle. According to one embodiment of the computing system 10, the client layer 52 makes use of a client stub component 130, a program resident on a end-user device, to enable device management.

Referring to FIG. 5, to summarize the architecture view shown, each layer makes use of a number of components to fulfill the necessary functions of the layer. According to the embodiment shown in FIG. 5, the data layer uses the database server component 68; the business logic layer 48 uses the application server 74, device management 76, administration 78, personalization 80, operational measurements 82, configuration 84, rules engine 86, miscellaneous 88, catalog 90, and data access 92 components; the presentation layer 50 employs the HTTP server 116, style sheets 126, and view controls 128 components; and the client layer 52 employs the client stub component 130.

Figure 9:
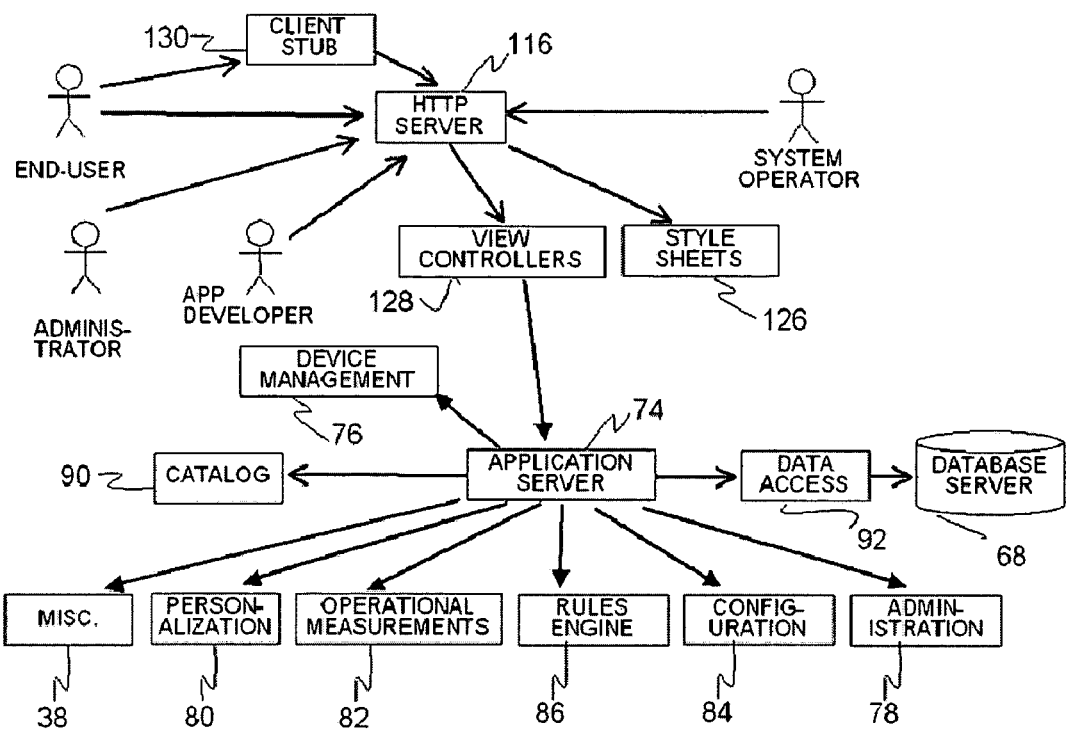
FIG. 9 is an architectural view showing the interaction of components and actors according to one embodiment of the present application.

FIG. 9 shows the relationships between the components and actors as enabled by the computing system 10 of the present invention. The HTTP server component 116 serves as a central access point for end-users 18, system operators 24, application developers 26, and administrators 28. End-users 18 may also interact directly with the client stub 130, which communicates with the HTTP server 116. The HTTP server 116, in turn, is in communication with the style sheets component 126 and the view controller components 128 to ensure proper formatting of content to users. The view controller 128 is in communication with the application server 74, which serves as a central server for handling requests from the presentation layer 50, accessing data in the data layer 46, and carrying out the business logic within the business logic layer 48. This functionality of the application server component 74 is enabled through its connections with the device management component 76, administration component 78, personalization component 80, operational measurement component 82, configuration component 84, rules engine component 86, miscellaneous component 88, catalog component 90, and data access component 92. The data access component 92, in turn, communicates with the database server component 68. The structure and operations of each of these components will now be described, starting with components at the data layer 46 and working up to components in the client layer 52.

Database Server and Data Access Components

The base component of the data layer 46 is the database server component 68, which may be any of a number of types of database servers, given adherence to certain desired server qualities. According to one embodiment of the computing system 10, it is preferred that the database server be indexed for rapid data retrieval and able to fulfill normal queries within 150 ms per query. According to other embodiments of the computing system 10, simple queries into cached data may resolve as quickly as within 10 ms per query, while more complicated queries involving more than lookups, such as update or modification actions, may take as long as 5000 ms. The database server is preferably able to support at least 5,000 queries per second, and must have a very large maximum size restriction, preferably in the terabyte range. The database 66 preferably has a native code API allowing optimized direct access by the database server component 68, further employing user and group policies to protect data access. Further, the database 66 should have a Simple Network Management Protocol (SNMP) agent, and if no SNMP agent is employed, then the database should not be adversely impacted by adding an agent as a service on the same database server 68. The database 66 is preferably provided with real-time remote administration capability and is preferably able to automatically detect and recover from data corruption. Furthermore, data access may be enhanced via the use of distributed network caches.

Figure 10:
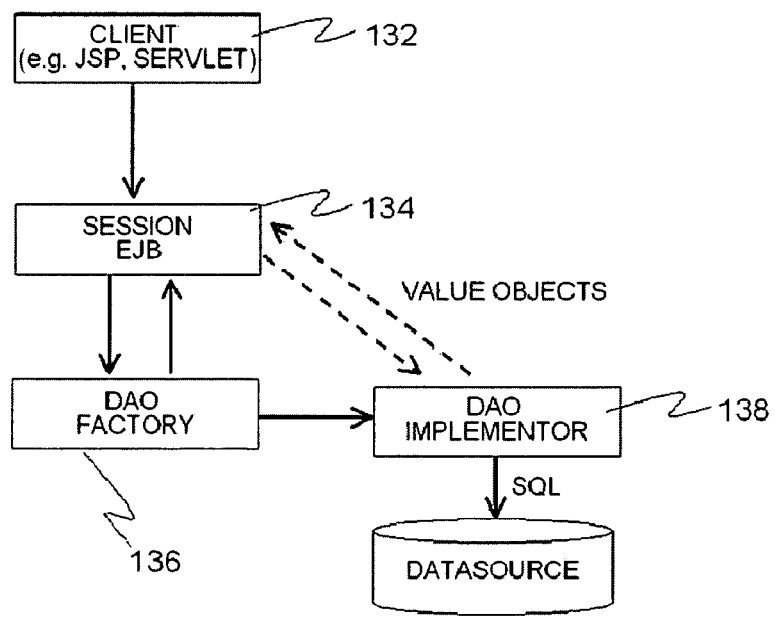
FIG. 10 is a data view showing data access according to one embodiment of the present invention.

FIG. 10 shows a data view illustrating the interaction of the data access component 92 and the database server component 68 in providing data at the business logic layer 48 (i.e., to the application server 74) according to one embodiment of the present invention. Data Access Objects (DAOs) are used at the business logic layer 48 to provide abstract data access to the data layer 46. This allows the data layer 46 to use any data solution without impacting the storage methodology of the logic components. As shown at block 132, data access begins when a client at the business logic layer 48, such as a JSP or a servlet, makes a request, initiating the creation of a session EJB as shown at block 134. The session EJB accesses a DAO factory as shown at block 136, which in turn uses a DAO implementor as shown at block 138 to make an SQL request to a data source 140 accessible by the database server 68. The DAOs are thus used by the data access component 92 to facilitate the transfer of value objects, or digital goods, between the data layer 46 and the business logic layer 48.

Figure 11:
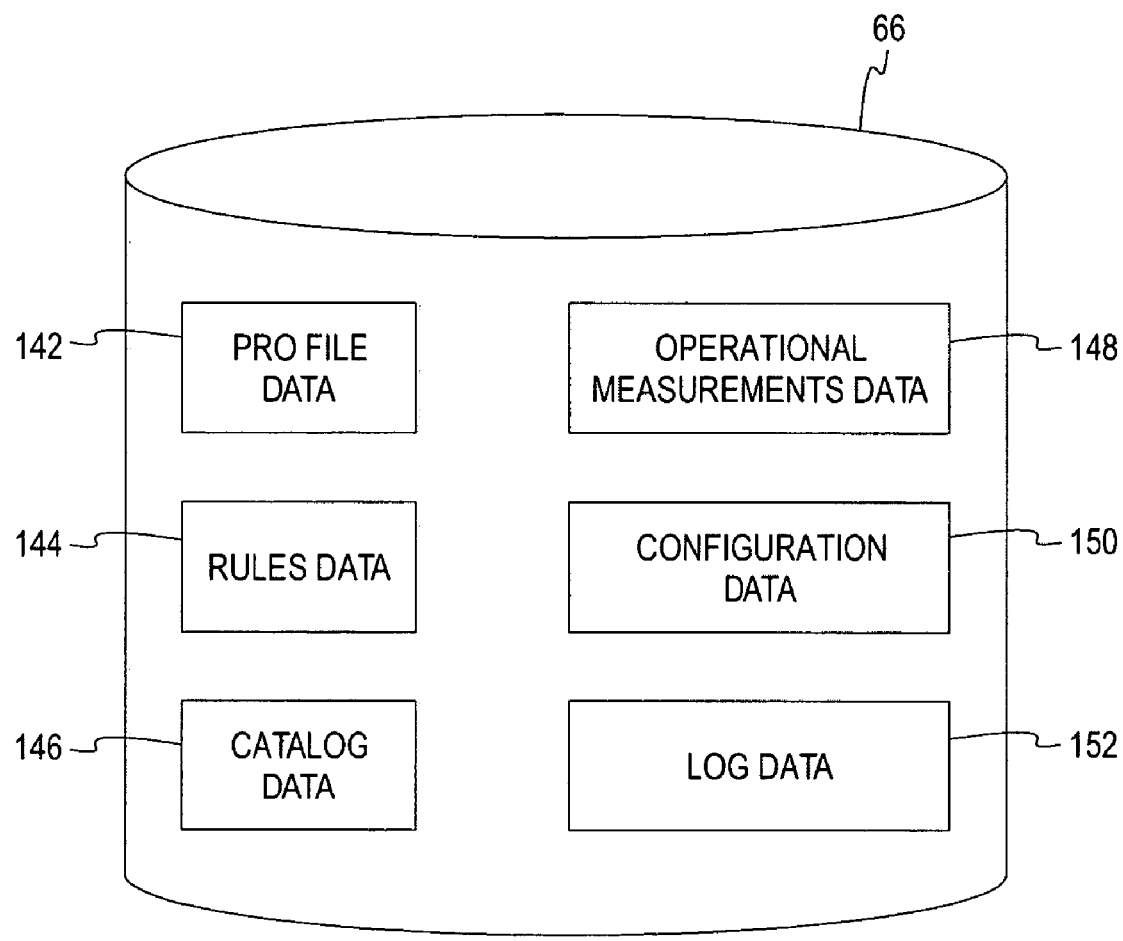
FIG. 11 is a data view showing data types within a database according to one embodiment of the present invention.

The database server component 68 is designed for access to a number of categories of data in the database 66. FIG. 11 is a data diagram showing categories into which data may be grouped in the database 66. Profile data 142 includes data related to the actors using the computing system 10. Data stored as profile data 142 may include user profile information, privilege and authority information, authentication information, secure data relating to billing, and miscellaneous solicited personal information.

Rules data 144 may include data such as rule XML DTDs, rules settings, rule sets, and rule definitions. According to one embodiment of the present invention, rules data 134 is stored as XML representations.

Catalog data 146 may include aggregated data content for catalogs. Data which may be stored as catalog data 146 includes catalog object such as applications and bundles, pertinent attributes, attribute mappings for imported source catalogs, historical change data, state of object data, access authorities, and references to remote data. According to one embodiment of the computing system 10, data stored as catalog data 146 is stored in the XML format, mapping to an XML DTD standard for catalog representation.

Operational measurement data 148 may include statistical information about software events (for example, bytes transferred, logins, non-fatal errors, and the like) that can be used to generate technical and marketing reports about system usage and performance. According to one embodiment, data stored as operational measurement data 148 is represented as a set of incremental/decremental registers.

Configuration data 150 includes configuration data for some or all components of the computing system 10. Data stored as configuration data 150 may include data such as configuration XML DTDs, information specific to individual components, system and component version information, essential startup parameters, and current and historical configurations and state information.

Log data 152 includes log information output by system components. Data stored as log data 152 may include web server logs, error logs, information logs, debug logs, component specific outputs, and the like.

According to one embodiment of the computing system 10, the database server component 68 is the central point of access to the shared back-plane of the computing system 10, and the database server host must be highly optimized to enable efficient handling of all read and update queries, of varying levels of complication. Thus, it is preferred that the database server host be a secured server, such that access to data is restricted to declared users and user groups using a privilege model. Further, the database server host is optimally provided with a large amount of RAM for caching common queries and for performing read/write caching on updates. For example, hosts having sixteen to thirty-two gigabytes of RAM are acceptable for use as database server hosts in one embodiment of the computing system 10. It is further preferred for the database server host to have multiple processors to handle the constant flow of transactions, with four- to eight-processor hosts being used in some embodiments. Further it is preferred for the database server host to support clustering and to have high bandwidth capability through network interfaces to handle high traffic loads. Bandwidths from 100 Mbps to 400 Mbps are used according to some embodiments of the computing system 10. Further, it is preferred for a database server host to have significant amounts of easily-expanded, redundant storage space, and 500 gigabyte to multi-terabyte redundant arrays of independent disks (RAIDs) are used in one embodiment of the present invention. It is further preferred to use two database server hosts: a first host for primary access, and a second host for data integrity (including a real time mirror), redundancy, and potential spillover access for read queries.

According to one embodiment of the computing system 10, a data integrity component is incorporated into the computing system, allowing the computing system to track specific versions of data objects within the computing system 10 and to prevent overwriting of other users' or administrators' changes to data objects.

Further, data manipulation within the computing system 10 may be made more efficient through the use of "dirty bit checking." In dirty bit checking, a data object meant to replace an existing data object within the computing system 10 is evaluated to determine which portions of the new data object are different from an existing data object. This enables transfer and updating only of the changed elements in the data object. For example, if an administrator chooses to update profile data for a user, but only alters information dealing with user entitlements, dirty bit checking enables the computing system 10 to identify that only a small portion of the profile data is being changed and to transmit and change only that portion, thereby reducing bandwidth necessary to effect changes to data objects.

Catalog Component

The catalog component 90 enables the holding of data at a warehouse level and the creation of views of warehouse items without the need for duplication of data. The catalog component 90 resides within the business logic layer 48 and consists of the business logic for feature activation, a web-based interface for feature access, and a catalog database storing content. According to one embodiment of the computing system 10, catalog data within the catalog component 90 is separated into two partitions: the system warehouse 32 and the local warehouse 34. The system warehouse 32 is alterable by the system administrator of the deployment domain, and the local warehouse is alterable by the administrator of the administrative domain, which may vary based on particular deployments of the computing system 10. For the purposes of describing the operation of the catalog component 90, a catalog object is an entry in a warehouse, and may be content such as an application, a bundle, or another type of data. Catalog data views are provided to all actors, and display active catalog objects from selected objects in the system warehouse 32 and the local warehouse 34.

The catalog component 90 supports the administration of catalog views, and further supports the creation, addition, removal and deletion of catalog objects to and from the catalog views and the warehouses. Further, in one embodiment of the present invention, the catalog component 90 provides an import capability to map external data sources to the catalog schema used within the warehouses, and uses XML or an XML variant for catalogs to represent data.

According to one embodiment of the present invention, digital goods within the warehouses are submitted by application developers 26 via a recognized workflow and organized into catalogs by administrators 28 for eventual presentation to end-users 18. The workflow may specify further steps, such as the certification of the digital good, virus testing, prepackaging for a target device, or other steps. End-users 18 can search catalogs for a desired product via catalog category browsing or via a full-text search facility. Further, the catalog component 90 may support end-user ratings and comments on digital goods within the warehouses, such that end-users may fulfill the roles of ratings agents. According to one embodiment of the computing system 10, the computing system 10 allows trusted actors, such as end-users, to create their own personal catalogs. Furthermore, catalogs may be dynamically generated based on the context of a browsing actor.

Figure 12:
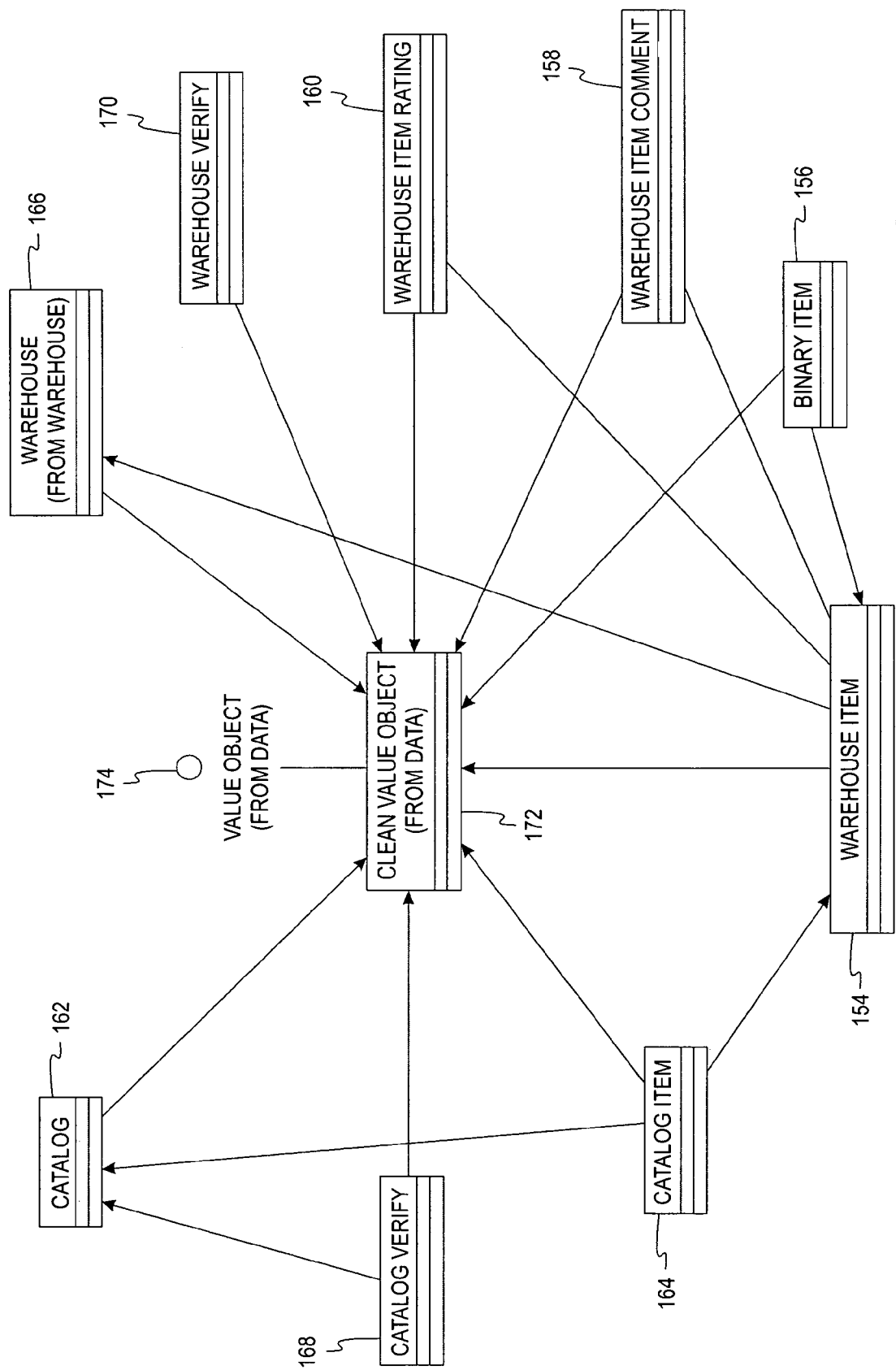
FIG. 12 is an object model of a catalog component according to one embodiment of the present invention.

FIG. 12 shows an object model diagram for the catalog component 90. To add an item to a warehouse, a user creates the warehouse item. A warehouse item 154 may be created by an application developer 26 or by an administrator 28. A warehouse item 154 can be associated with one or more binaries 156, which contain any uploadable file (such as .exe, .prc, or .pdb files). Users can comment on and rate items using warehouse item comment 158 and warehouse item rating 160 components. Administrators can create one or more views of a warehouse, and these views are handled using a catalog object 162. The catalog component 90 further includes catalog items 164, which are views of individual warehouse items 154. Warehouse items 154 and catalog items 164 may exist in a number of states, including "new item" states, which allow administrators to find, view, verify, modify, and delete newly submitted items and to enable the newly-submitted items to be active or visible to users.

States for warehouse items 154 may include active and inactive states, and states for catalog items 164 may include visible and invisible states. A warehouse object 166 is resident within a warehouse and represents the digital good being manipulated in the catalog component 90. Verification of catalog objects 162 and warehouse objects 166 may be accomplished using a catalog verification object 168 and a warehouse verification object 170, respectively. Further, either a warehouse administrator or a catalog administrator may perform a verification process manually, with the administrators configuring the list of verification criteria using an interface. The catalog component 90 can manage the verification criteria for each warehouse and catalog. Each of the models within the catalog component 90 uses a clean value object 172, which is gleaned from a value object 174 in a database. The two-tier system of catalog items and warehouse items allows warehouse items and catalog items to represent two different item views for one digital good. For example, the price of an item at the catalog level may be the same as the price specified at the warehouse level, or the warehouse level may be overridden in certain catalog views to optimize prices for certain users.

Further, the catalog views available to certain user groups may be different from catalog views available to other user groups. For example, a user group for "preferred customers" may have access to catalog views having lower prices or other advantages over "standard customers." Thus, though the base binary file may be stored at only one place in the computing system 10, or even outside the computing system 10, several different views of the item can be provided within the computing system 10, with the views easily changeable and customizable.

Similar grouping of users to enable customized catalog views may include separation of users into "gold memberships" and "silver memberships." In this example, users having a gold membership and a silver membership may both have access to catalogs which hold the same products, with the "gold catalog" holding items with prices 20% lower than the prices listed in the "silver catalog." Similarly, some users of the computing system 10 might want to have their catalogs available in German with prices in Euros, while other users might want catalogs available in Japanese with the prices in Yen. Both catalogs may refer to the same items in a warehouse, but the details may be replaced in the catalog views to suit specific markets of users. Temporal catalog view changes may also be employed, such as decreasing prices by 20% on weekends to encourage weekend use of the computing system 10.

Figure 13:
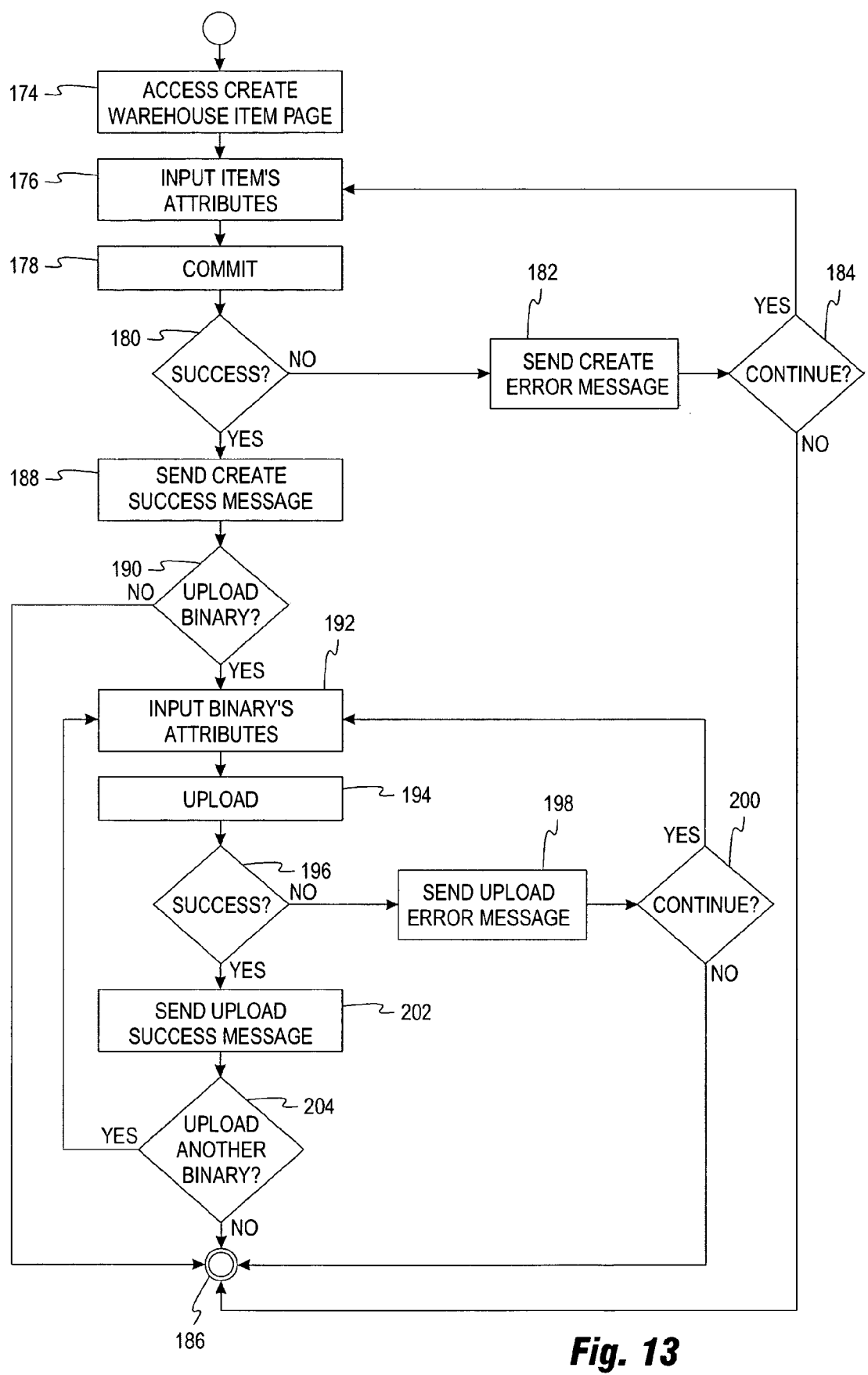
FIG. 13 is a flow chart showing the process of warehouse item creation according to one embodiment of the present invention.

FIGS. 13-17 show flow diagrams illustrating the performance of various functions in the catalog component 90. FIG. 13 shows the steps involved in creating a warehouse item. To create a warehouse item, an administrator 28 first accesses a "create warehouse item" page as shown at block 174. This page may be accessed using the computing system's web tier, described in greater detail below. Next, the administrator inputs the item attributes as shown at block 176. Item attributes may include such fields as an item name, version, short description, long description, suggested search keywords, an image or screenshot, category, an operating system for a file, file size, minimum system requirements, license type (for security purposes), price, item type, and an enable or disable flag. After reviewing the attributes, the administrator commits to the warehouse item as shown at block 178. Next, as shown at decision block 178, the web tier determines whether the initial creation of the warehouse item was a success. If the initial creation is unsuccessful, the administrator receives a "create error" message as shown at block 182. The administrator is given a choice of whether to continue attempting to create the item at this point, as shown at decision block 184. If the administrator chooses to attempt to create the warehouse item again, the administrator inputs the item's attributes again, as shown at block 176. If the administrator chooses not to attempt to create the warehouse item again, the creation terminates as shown at termination block 186.

If the creation of a warehouse item at decision block 180 is successful, the web tier creates the warehouse item and sends a "create success" message to the administrator as shown at block 188. At this point, the administrator is asked whether he wishes to upload a binary associated with the warehouse item, as shown at decision block 190. If the administrator does not wish to upload a binary associated with the warehouse item, the warehouse item creation terminates at termination block 186. If the administrator chooses to upload a binary associated with the warehouse item, the administrator inputs the binary's attributes as shown at block 192. Next, the administrator uploads the binary to the warehouse as shown at block 194. The system then determines at decision block 196 whether the binary upload is successful. If the binary upload is not successful, the system sends an "upload error" message as shown at block 198, and the administrator is given a choice to continue uploading the binary as shown at block 200. If the administrator chooses to continue to attempt to upload the binary, the administrator next inputs the binary's attributes again as shown at block 192. If the administrator chooses not to continue attempting to upload the binary, the creation of the warehouse item terminates at termination block 186.

If the binary upload is a success at block 196, the system sends the administrator an "upload success" message as shown at block 202, and then the administrator is asked whether he wants to upload another binary associated with the warehouse item. If the administrator chooses to upload another binary, the administrator inputs the additional binary's attributes at block 192. If the administrator chooses not to upload another binary, the creation of the warehouse item terminates as shown at termination block 186.

Figure 14:
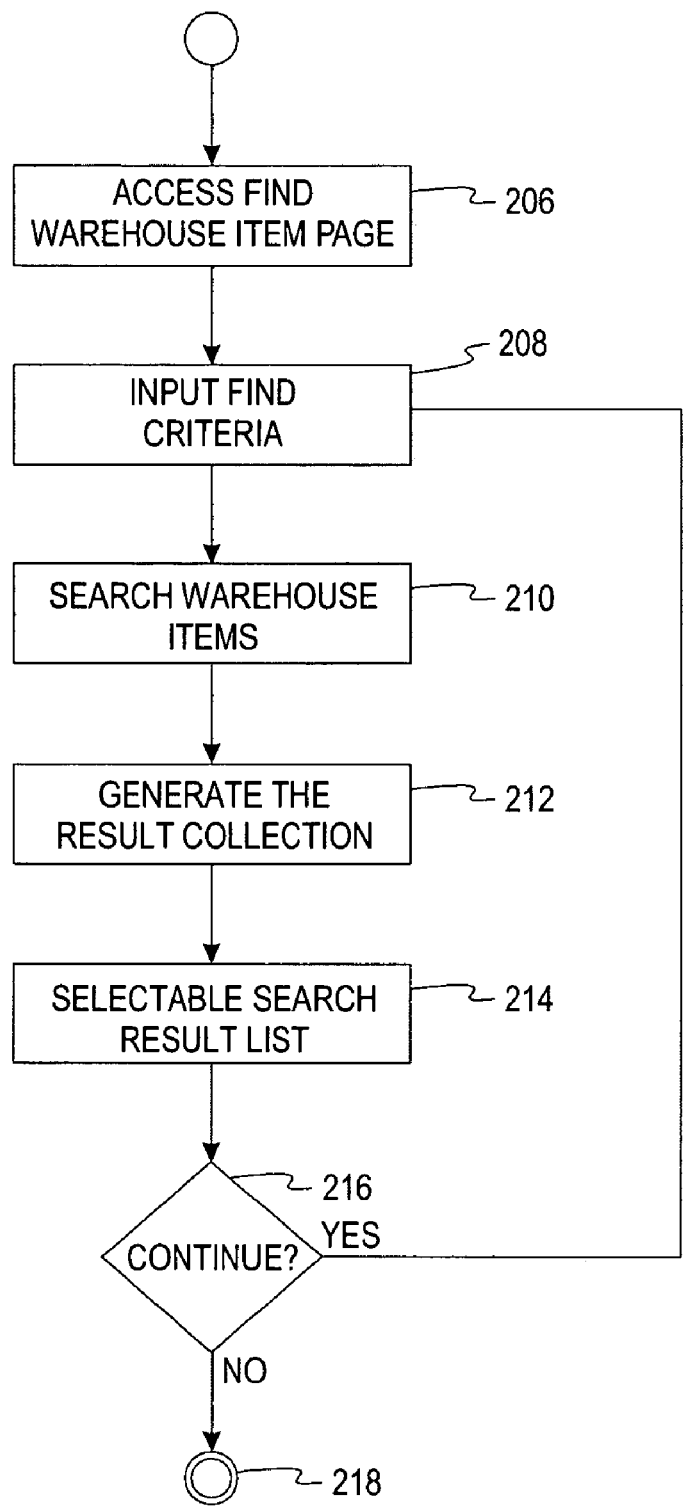
FIG. 14 is a flow chart showing the process of finding a warehouse item according to one embodiment of the present invention.

The catalog component 90 also supports user searching for warehouse items, as shown in FIG. 14. To begin searching for a warehouse item, an administrator first accesses a "find warehouse item" page using the system's web tier as shown at block 206. Next, the user inputs search criteria as shown at block 208. The system then searches the warehouse items based on the search criteria, as shown at block 210 and generates a collection of results as shown at block 212. The result collection may be displayed as a selectable search result list as shown at block 214. Next, as shown at decision block 216, the user is asked whether he wishes to continue searching. If the another search is desired, the user once again inputs find criteria as shown at block 208. If no other search is desired at decision block 216, the warehouse item search terminates as shown at termination block 218.

Figure 15A:
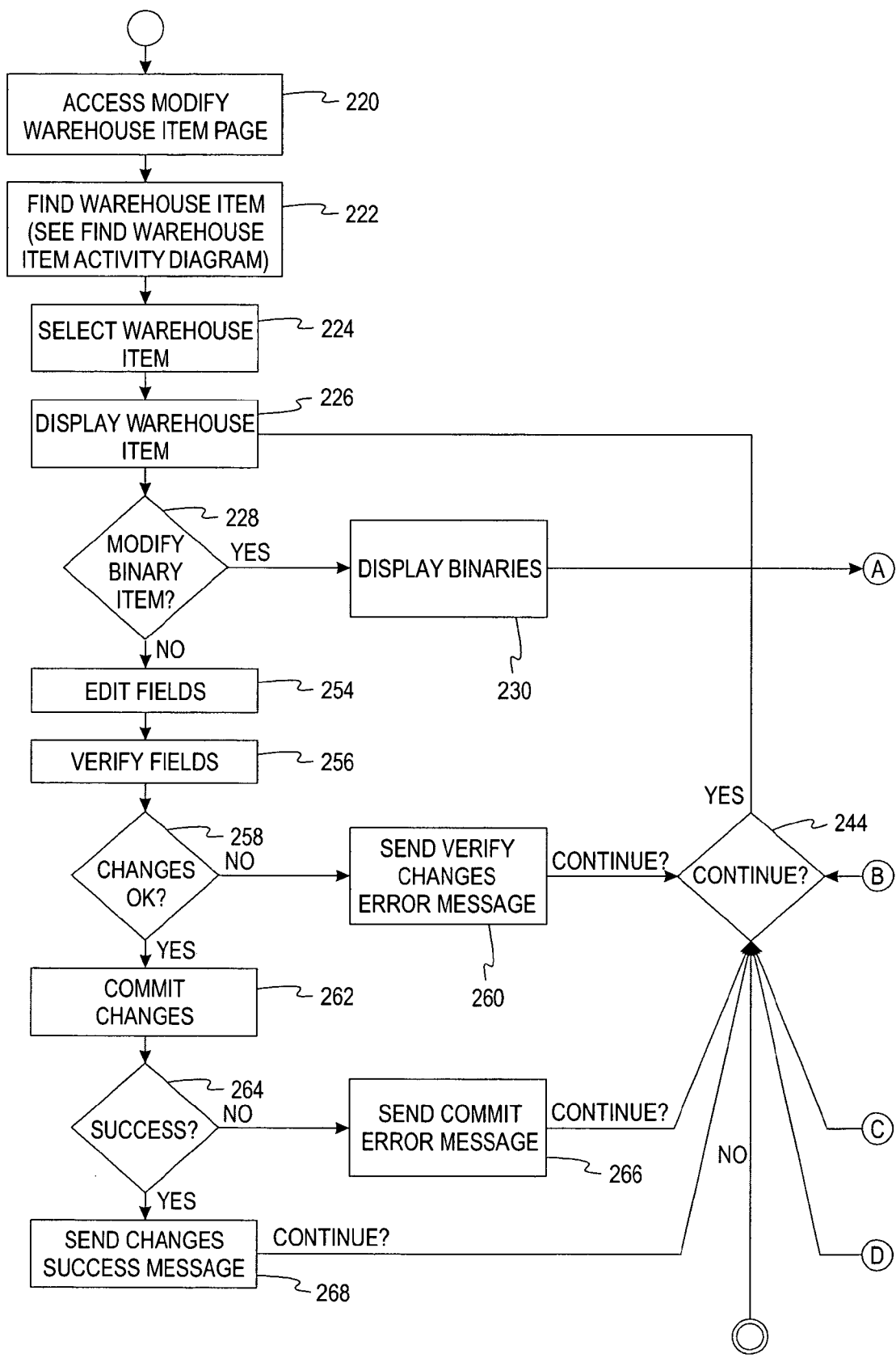
FIGS. 15a and b show a a flow chart showing the process of modifying a warehouse item according to one embodiment of the present invention.
Figure 15B:
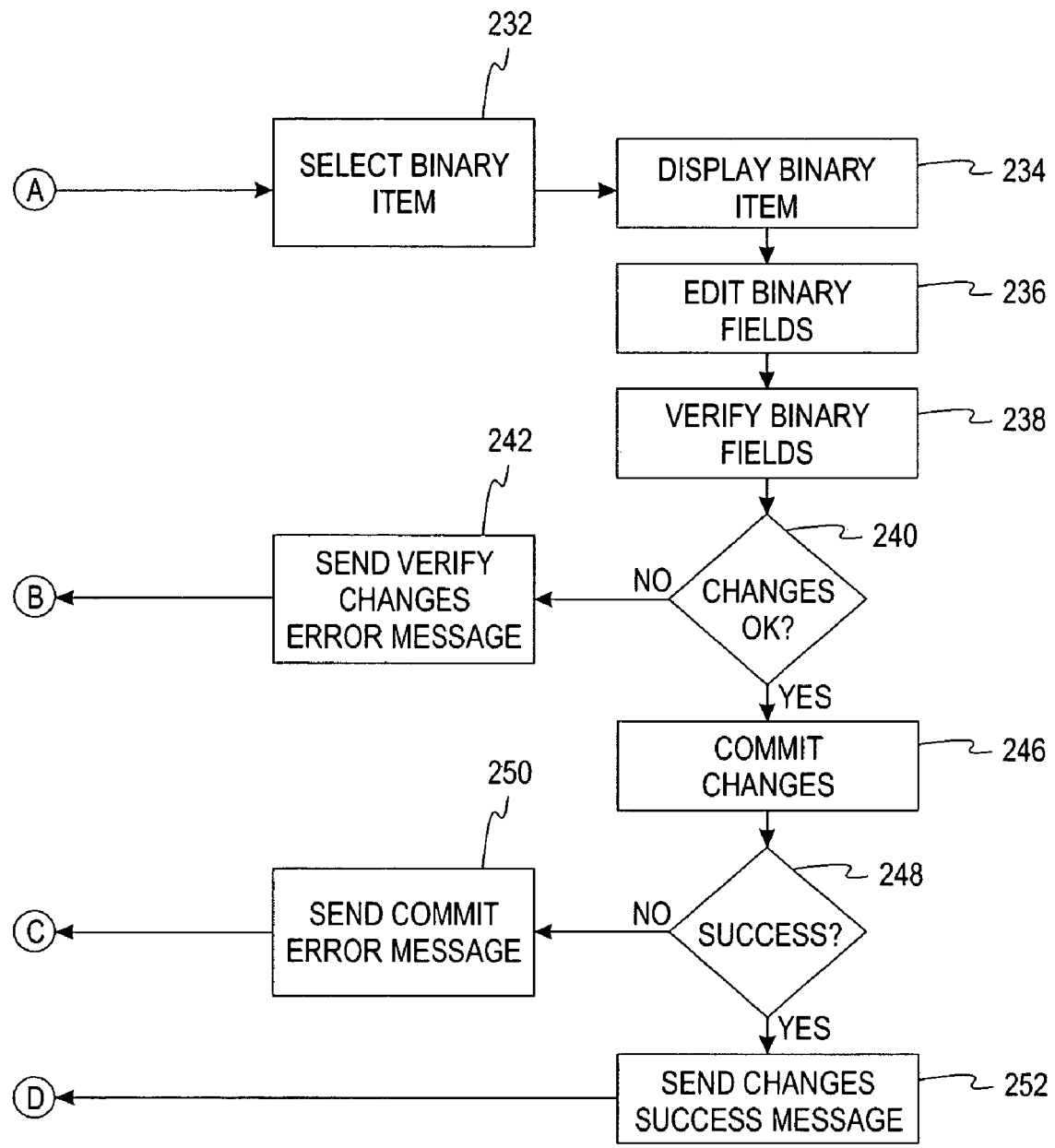

The catalog component 90 further supports administrator modification of warehouse items, as shown in FIGS. 15a and 15b. To modify warehouse items, a user first accesses a "modify warehouse item" page as shown at block 220. Next, the administrator finds the warehouse item using the search technique shown at FIG. 14, as shown at block 222. After the administrator has selected the warehouse item to modify, as shown at block 224, the system displays the warehouse item for the administrator at block 226. The administrator is then asked if he wishes to modify binary items associated with the warehouse item, at decision block 228. If the administrator wishes to modify binary items, the system displays the binaries to the administrator at block 230, and the administrator selects the binary item to modify at block 232. After being shown the binary item to be changed at block 234, the administrator edits the binary fields at block 236 and the binary fields are verified as shown at block 238. The system then determines whether the changes to the binary are acceptable, as shown at decision block 240. If the changes are unacceptable, the system sends the administrator a "verify changes" error message as shown at block 242, and the administrator is asked whether he wishes to continue modifying the warehouse item at decision block 244. If the administrator chooses not to continue modifying the warehouse item, the warehouse modification terminates at termination block 245. If the administrator chooses to continue modifying the warehouse item at block 244, the system displays the warehouse item again at block 226.

If the binary changes are determined to be acceptable at block 240, the system attempts to commit to the changes as shown at block 246. If the changes are committed successfully, as shown at decision block 248, the system sends the administrator a "changes successful" message as shown at block 252 and asks the administrator whether he wishes to continue modifying the warehouse item at block 244. If the changes are not committed successfully at decision block 248, the system sends the administrator a "commit error" message at block 250 and asks whether the administrator wishes to continue to modify the warehouse item at decision block 244.

Upon completion of attempted modifications of binary items or upon an administrator's determination not to modify any binary items associated with the warehouse item at block 228, the administrator is given the opportunity to edit descriptive fields associated with the warehouse item as shown at block 254 and the fields are verified as shown at block 256. Next, as shown at decision block 258, the system determines whether the field changes are appropriate by checking, for example, formatting and value ranges. If the changes are not appropriate, the system sends the administrator a "verify changes error" message as shown at block 260, and gives the administrator a choice of whether to continue with the modification of the warehouse item at block 244. If the changes are appropriate, the changes are committed to as shown at block 262 and the system determines whether the changes are correctly committed at decision block 264. If the changes are not correctly committed at block 264, the system sends a "commit error" message to the administrator as shown at block 266 and allows the administrator to choose whether to continue modifying the warehouse item at decision block 244. If the committed changes are successful at decision block 264, the system sends a "changes successful" message to the administrator as shown at block 268, then gives the administrator the option to continuing modifying the warehouse item at decision block 244. Once the administrator determines no more changes are necessary to the warehouse item, item modification terminates at termination block 245.

Other functions supported by the catalog component 90 include the deletion and verification of warehouse items. The deletion of warehouse items includes the deletion of associated binary items and associated catalog items, along with deletions of user ratings and comments. Verification of warehouse items includes a step of determining whether a user wishing to verify a warehouse items has sufficient access privileges for accessing and verifying the warehouse items and performing verifications based on verification criteria.

According to one embodiment of the computing system 10, the catalog component 90 enables end-users, administrators, and system operators to page, sort, filter, and search listed items. Paging enables the grouping of items into page views, with navigation through the pages via number inputs, arrows, or both. According to one embodiment of the computing system 10, paging allows both sequential and random access to pages of results by a combination of numerical inputs and icon selection.

Sorting allows users to display lists in orderly ways. Sorting may be used in combination with paging to allow users to intelligently surmise which pages of a list contain the objects they are interested in. Ascending and descending sorts according to a number of item attributes, such as item names, item sizes, and item types are enabled in one embodiment of the computing system 10.

Filtering enables users to restrict the number of objects in a list. Filters may be chosen to closely match the types of tasks that a user, such as an administrator, is performing. For example, an administrator may wish to view a list of all the users who have not logged into the computing system 10 for a certain amount of time. Such a filter may be entitled "dormant," because it identifies users believed to be dormant.

Keyword searching may also be used by system operators, administrators, and end-users to restrict the number of objects in a list. In keyword searching, an administrator provides the text the computing system 10 should search for. For example, an administrator may wish to view a specific warehouse item that they know contains a certain game title in the name. Using the game title keyword in a search will return a very limited list of objects, one of which will be the desired object.

Application Server Component

The application server component 74 provides an EJB container at the business logic layer 48 and performs load balancing and clustering operations to enable efficient workflows in the computing system 10. The application server component 74 may be the device through which other components, such as the device management component 76, personalization component 80, rules engine component 86, and catalog component 90 are implemented.

It is preferred to use a host for the application server component 74 that is capable of handling thousands of concurrent processes, thousands of open sockets, and several megabytes of data. The application server host must have enough processing power to handle multiple concurrent tasks, and four- CPU systems are preferred as application server hosts according to one embodiment of the computing system 10. The application server host also needs sufficient RAM to process a large amount of media and textual data per transaction, as well as to meet caching database requirements. The application server host should have sufficient disk space to store an operating system and required software, perform patches and updates, cache information from databases when the information is not in RAM, and to store server logs and error reports. According to one embodiment, the application server host is provided with 20 gigabytes of disk space.

It is preferred for the computing system 10 to be agnostic to application servers, such that a variety of different types of servers may be used as application servers. This server agnosticism contributes to the ability of the computing system 10 to utilize a distributed architecture and to facilitate redundancy, scalability, and clustering in different types of deployments of the computing system 10.

Device Management Component

The device management component 76 enables data management and device auditing by end-users and administrators on OS-enabled devices. According to one embodiment of the invention, the device management component 76 uses an EJB server layer, a web presentation layer, a conduit Simple Object Access Protocol (SOAP) servlet layer, a desktop conduit, and the device client stub 130 to perform its functions. Alternatively, the device management component 76 may operate without a conduit, depending on the specifications of the particular mobile devices being used in particular deployments of the computing system 10. The device management component 76 may also be implemented via XML, packaged with SOAP.

In more detail, the device management component 76 provides the tools necessary for end users and administrators to manage digital goods on devices. According to one embodiment, the device management component 76 focuses on the management of digital goods on mobile OS-enabled devices. In one embodiment of the device management component 76, end-users have collections of digital goods that they are entitled to. In this usage, "entitlement" to a digital good means having the ability to install the digital good on a device. Entitlement may be acquired by an end-user, for example, through end-users purchasing items or by an administrator "pushing" the item to end-users. Users may also acquire digital goods from other sources, such as from other end-users or from other data sources. According to one embodiment of the computing system 10, the open-ended nature of item sources is enabled because physical content is not stored within the computing system 10. Rather, in this embodiment, the computing system 10 provides information content specifications and location to users and enables content acquisition without requiring storage of content within the computing system 10.

As described above, digital goods are maintained in warehouses 32 and 34 (see FIG. 3) that can be visible at the system domain, administrator domain, or end-user level. Catalogs 42 are used to exposed views on digital goods in a more organized fashion.

End-users may be allowed to manage multiple devices in their profiles and may independently maintain each device. End-users may also update which items they are entitled to by acquiring items from warehouses or downloading items from other sources. End-users can then determine which of their "entitled" items should be installed on their devices and indicate which items they wish to have removed from their devices. Administrators can also control which items users are entitled to. The administrators further have the option to mark items as mandatory, with mandatory items being pushed to end-users' devices without the end-users' control.

Figure 16:
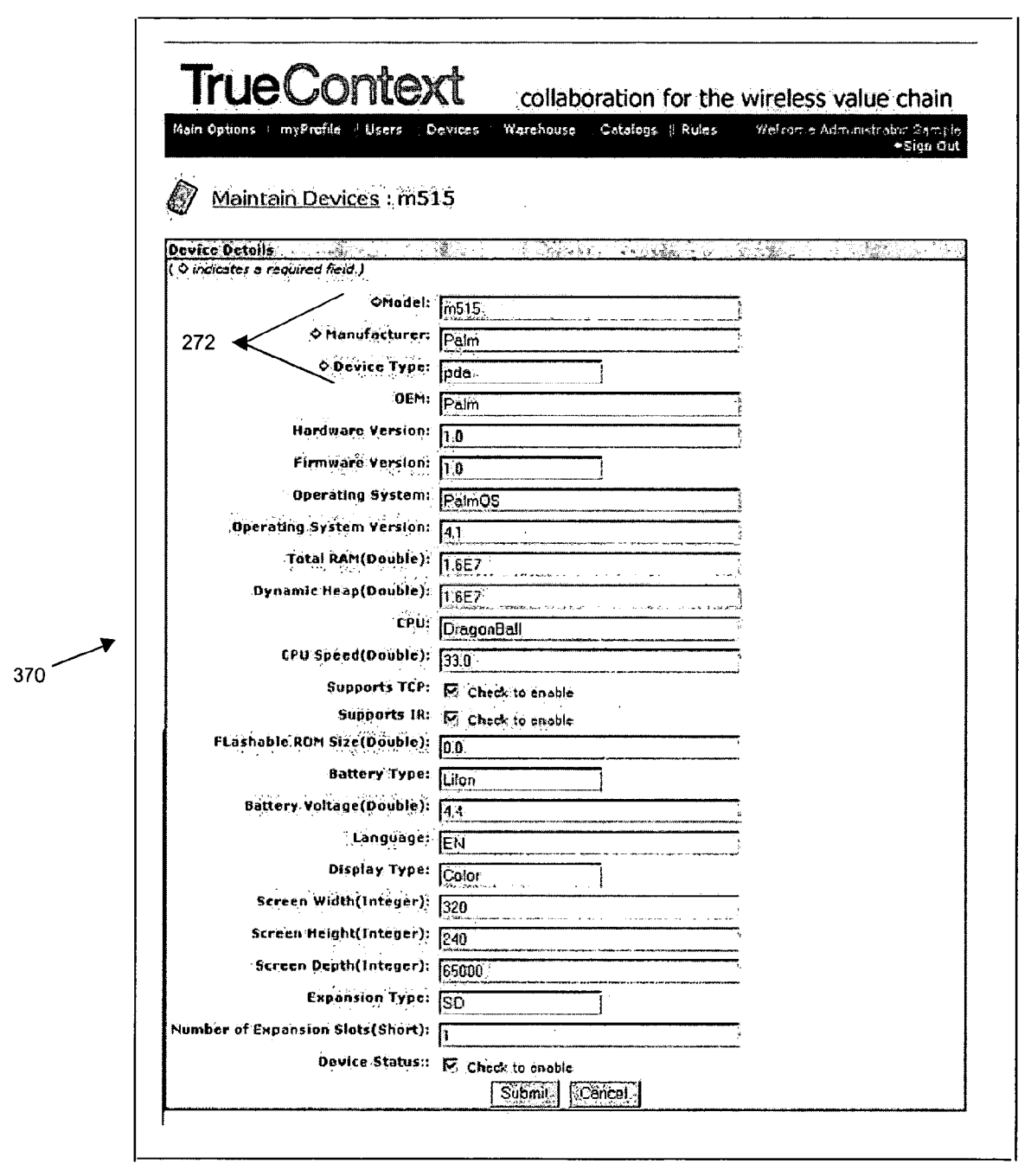
Figure 17:
FIG. 17 is a screen view of a device maintenance page according to one embodiment of the present invention.
Figure 18:
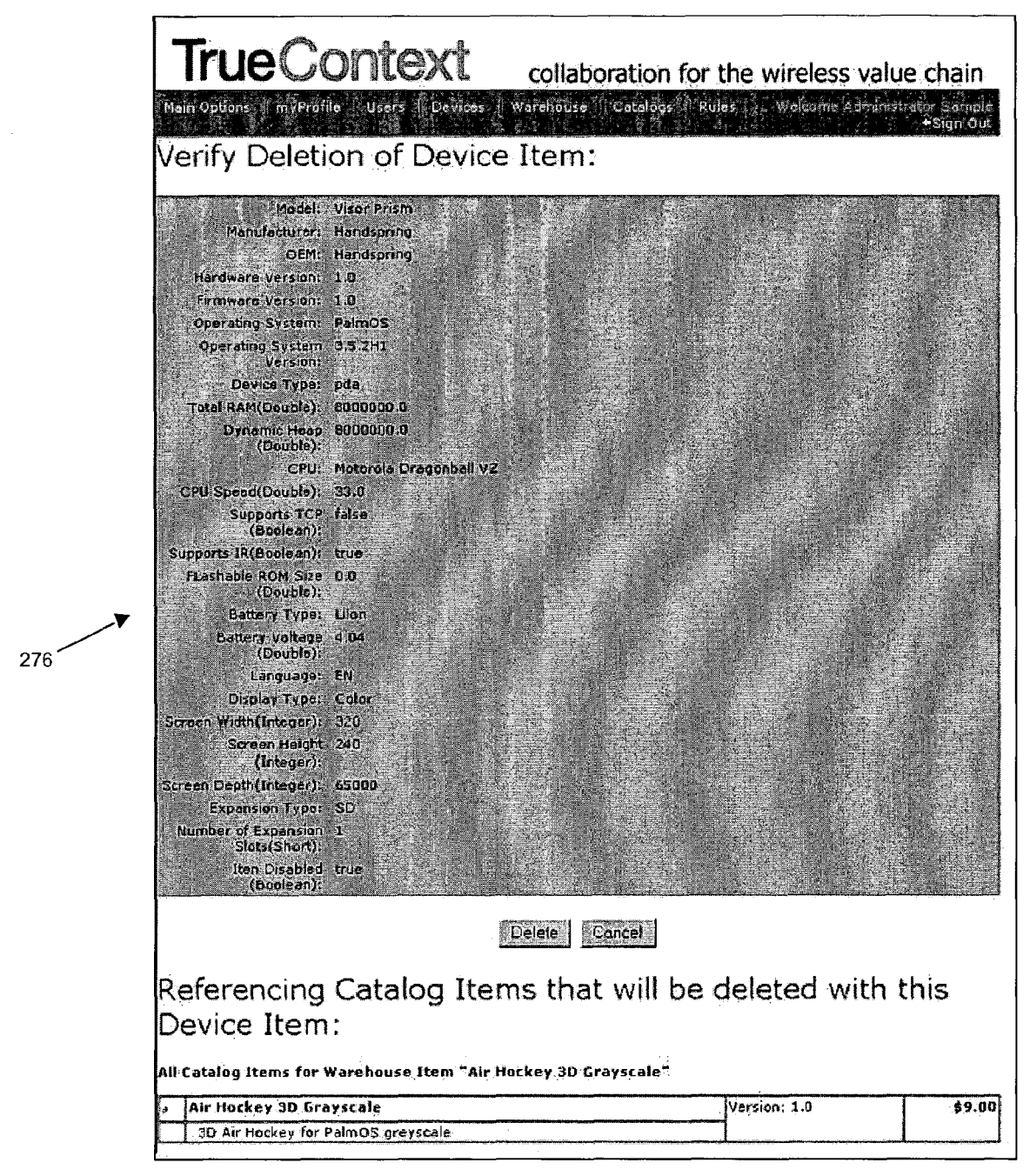

Turning to FIG. 16, a device details page 270 accessible by an administrator using the device management component 76 is shown. The device details page allows administrators to manage devices supported by the computing system 10. As new devices are introduced into the network or enterprise environment, administrators can add new devices to enable their users to take advantage of the latest products and technology or delete devices that are no longer supported. The device details page 270 shows the fields which an administrator may populate in describing a newly-supported device, or check on to confirm that a device is specified correctly. According to one embodiment, required fields 272 represent the absolute minimum information that must be inputted for a device to work on the computing system 10. Types of devices which may be specified for use with the computing system 10 include pagers, handheld computers or PDAs, including palm-sized PDAs, mobile phones, smart phones, workstations, and servers. A supported device may maintain information about the domain it belongs to (for example, a system operator domain or an administrator domain). Further, it is preferred for supported devices to track information about expansion capabilities, such as the number of expansion slots, supported cards, and expansion media types. To further illustrate the interface used by administrators to maintain devices in the device management component 76, FIG. 17 is a screen shot of a device maintenance page 274 allowing an administrator to access a number of device types for maintenance, and FIG. 18 is a screen shot of a device deletion page 276, which informs an administrator about a device before the administrator finally deletes the device from the computing system 10.

User devices may be defined as classes of devices used to model physical OS-enabled devices owned by users. User devices preferably contain a reference to the owning user and have reference to the proper supported device that describes the common attributes of the device type. According to one embodiment of the computing system 10, user devices are adapted to track dynamically configured binary large objects (BLOBs), allowing synchronization business logic to track device-specific information and any other data required to affect synchronizations properly. User devices should further allow for dynamically defined extensions of the device, similarly to the "Ext" element of Synchronization Markup Language (SyncML). Further, it is preferred for user devices to be capable of tracking supported Multi-Purpose Internet Mail Extension (MIME) types and associated "player" applications, such as e-book readers. Tracking of MIME types and player applications may be done using SyncML content type capabilities in XML format.

Digital goods resident on user devices are termed "device items." Thus, a device item may be any type of digital good, such as an application or an electronic book. When a user device is a PalmOS-enabled device, for example, a digital good is a database. According to one embodiment of the present invention, device items are provided with a number of attributes. Device items preferably track which devices the items belong to and which digital goods are being represented by the device items. Further, device items preferably track their current known states, including information on whether the device items are installed, and map to an identification marker local to the device. For example, on a PalmOS-enabled device, the identification marker is the Creator ID/type combination. In addition, a device item preferably tracks an action status indicating actions that need to performed during the next synchronization event. Action statuses may include values for no action, where an item is installed and does not need any updating, values for items to be installed, values for items to be removed (including soft and hard deletion capabilities), values for items to be backed up, and values for items to be restored. A device item preferably has its current state updated once an action is successfully completed and verified during the synchronization event. The action status may be updated to "no action" once any desired action has been verified as completed successfully or failed and canceled. Further, it is preferred for device items to track the timestamp for a completed action, including such timestamps as an installed date, a removed date, a backed-up date, and a restored date. Synchronization of devices may be accomplished through the use of a conduit, software that communicates between a synchronization agent on a desktop machine and a device (such as a cradle or a mobile device) connected by wire line to the desktop machine. Alternatively, synchronization may be accomplished without the use of a conduit, such as via direct wire line or wireless communication between mobile devices and components of the computing system 10.

According to one embodiment of the computing system 10, administrators manage devices through the use of a device management session interface having such options as: finding a device item by a device item key, finding device items by related entitled items, confirming device compatibility based on external rules (including the provision of full error and status information back to the administrator for proper diagnosis of results), finding user devices by user, finding user devices by keys, finding user devices by supported devices (including filtering of supported devices by type, OS type, and the like), finding user devices by users and/or groups, finding device items by searching based on user devices, creating device items for specific user devices (including providing reference to entitled items which may be referenced to an internal catalog or to a user warehouse), removing device items from specified user devices, performing actions such as installation and removal of device items (including indicating whether an action is an administrator-instigated action such as a "push"), and retrieving, adding, removing, and updating Ext items, CTCap items, log items, BLOBs, and attribute items for user devices.

The device management component 76 may work in concert with the rules engine component 86 to enable automatic device management once rules have been established in the rules engine component 86. According to one embodiment of the computing system 10, the device management component 76 allows for virtual storage of digital goods such that digital goods are only resident on devices when they are necessary. This functionality allows bulky digital goods to be stored outside the computing system 10 and accessed and installed on devices only when the digital goods are necessary for a particular device in a particular context.

Rules Engine Component

According to one embodiment of the computing system 10, administrators and system operators may incorporate basic business logic into the system by creating rules and rulesets in plain language using the rules engine component 86. The rules engine component 86 allows the definition of policies such that a combination of events and profiles can be used to generate appropriate actions within the computing system 10, and further allows for the declaration of flexible policies that are not necessarily embedded within the computing system 10 and can be defined by administrators in real-time. Rules, when grouped as policies, allow event-triggered actions to be governed by user profiles. A business rule is a statement that describes how a business is organized, how a business decision is made, or how a business process works. Examples of business rules include: a) "if an order exceeds $325 and the customer has a good credit history, then discount the order by 15%"; and b) "if the user is trying to install an application and a newer version of the application exists on their device, then do not perform the installation and alert the user of the problem."

Other rules may have a more direct effect on user devices. For example, a rule may be implemented which detects the current level of a user device's backup battery and informs the user when the backup battery is low. Such a rule may be phrased, "if the amount of charge left in a user device's backup battery is less than 30%, push a message to the user informing the user to change the backup battery." Further, rules may be nested or provided with interdependencies. An example of this type of rule would be the determination of whether to install a software application on a user device based on the amount of memory available on the user device. Such a rule could have two parts: a first part stating, "the total memory required for the software application is the sum of the software application memory required and the memory required to run the OS," and a second part stating, "if the total memory required is greater than the total device memory, then do not install the software application; otherwise, install the software application."

Rules may be grouped together into rulesets. Rulesets may be grouped based on a number of qualities, such as rule functionality, similarities of triggering events, and user groups upon which rules act. Rules within rulesets may be dependent upon each other, or they may operate independently of each other, according to the needs of business logic. It is preferred to allow users such as administrators and system operators to access the rules engine component 86 using a web-based interface, as shown in FIGS. 19 through 23. The rules engine component 86 is integrated into the entire computing system 10, so that any events within the computing system 10 can serve as triggers for carrying out specified rules. Rules allow "cause-and-effect" operations within the computing system 10, and it is preferred to utilize a rule system which allows for precedence and chaining of rules, as well as real-time reaction to rule triggers. To enhance data portability within the rules engine component 86, it is preferred to use XML DTDs and to implement the rules system using a web-based interface.

Figure 19:
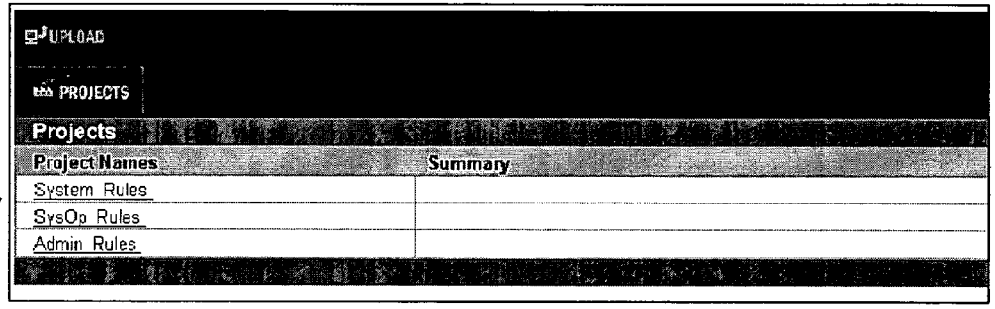
FIG. 19 is a screen view of a rule maintenance page according to one embodiment of the present invention.
Figure 20:
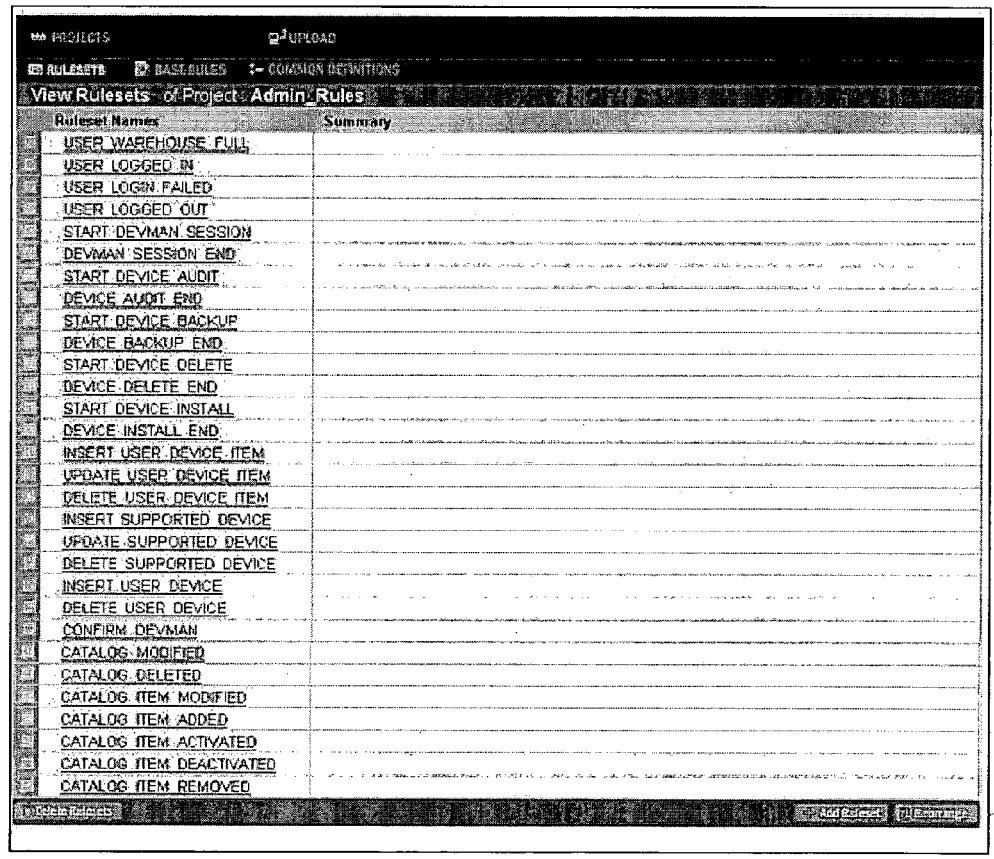
FIG. 20 is a screen view of a ruleset list page according to one embodiment of the present invention.
Figures 21, 22:
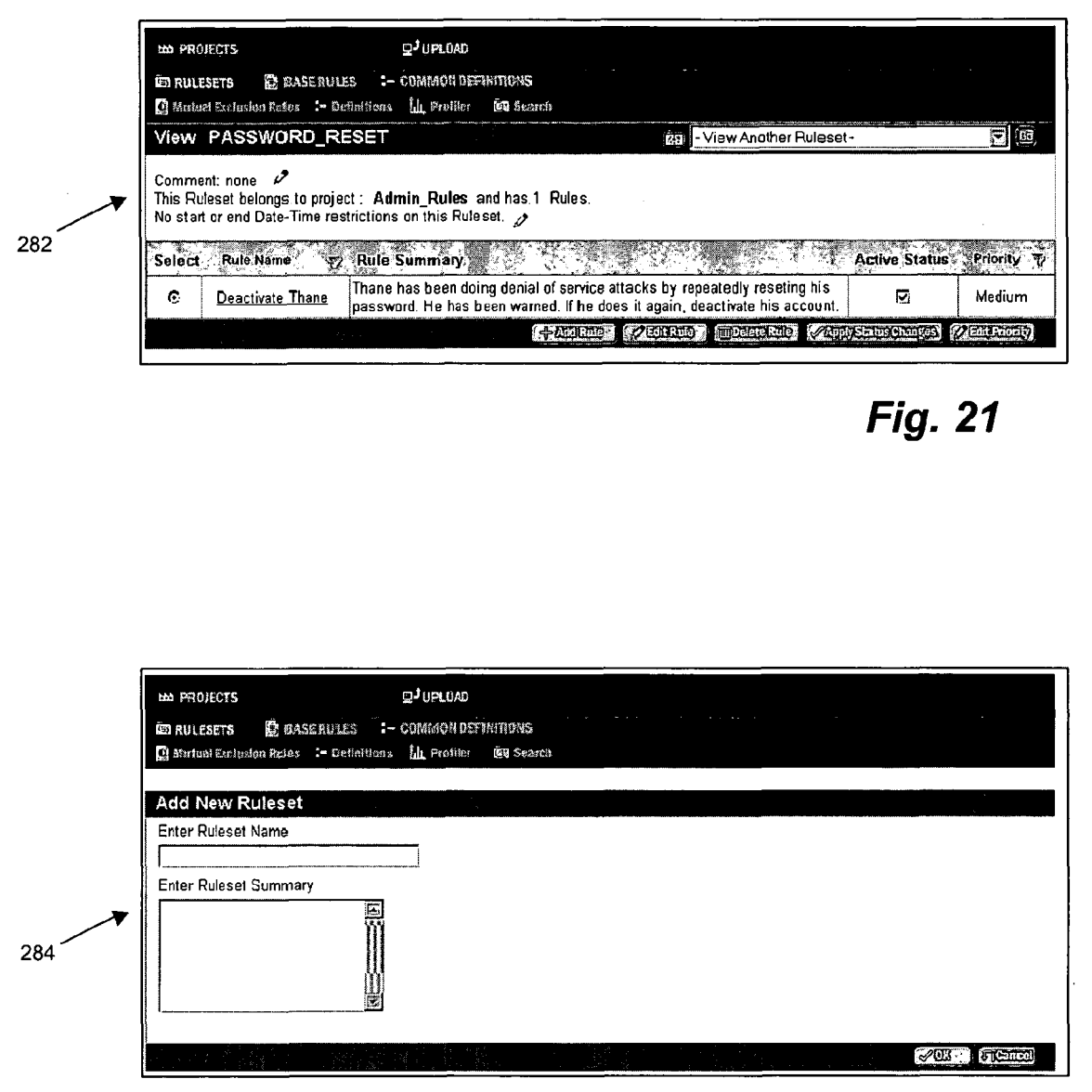

FIG. 19 shows a rule maintenance interface page 278 which presents a user with a starting point from which to view, create, delete, and rearrange rule sets and view, create, delete, and modify rules. The rule maintenance interface page 278 shows a user categories of rulesets. When an administrator chooses a particular category of rulesets to interact with, a ruleset list page 280, containing a list of rulesets and, optionally, summary information about the rulesets as shown in FIG. 20, is displayed. To work with a particular ruleset, the user chooses a ruleset from the ruleset list page 280, accessing a rule selection page 282, shown in FIG. 21. The rule selection page 282 of FIG. 21 shows only one rule regarding the deactivation of a user named "Thane." The rule selection page 282 includes such information as the rule name, the rule summary, information on whether or not the rule is active, and the priority of the rule. According to the embodiment shown in FIG. 21, the rule selection page 282 allows the user to access the functions of adding rules, editing rules, deleting rules, applying status changes to rules, and editing rule priority.

A user may create a new ruleset using the ruleset creation page 284 shown in FIG. 22. When a user enters a ruleset name and, optionally, a ruleset summary, the new ruleset is added to the ruleset list page 280, ready for rules to be added. Rulesets may similarly be deleted by using the "delete ruleset" function shown on the ruleset list page 280.

Figure 23:
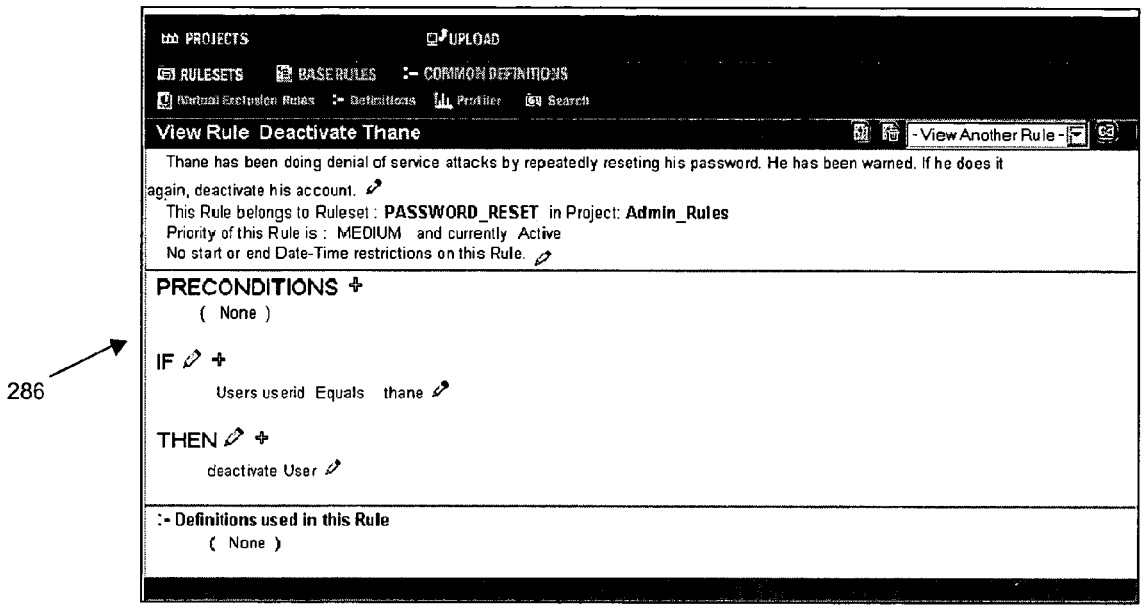
FIG. 23 is a screen view of a rule view page according to one embodiment of the present invention.

Users may select rules for viewing and editing from the rule selection page 282, entering a rule view page 286 as shown in FIG. 23. The rule view page 286 includes a plain language view of the rule as well as a logical view of the rule, allowing for easy recognition of the rule and rule behavior by the user.

Certain embodiments of the computing system 10 have specific requirements for the rules engine component 86. In some embodiments of the computing system 10, system rules are modifiable only by developers of the computing system 10 or by professional services providers. In some implementations, it is preferable to have rules specific to individual domains (for example, administrator domains and system operator domains) such that they are visible and modifiable only by domain administrators or system operators. It is also possible to specify rules that apply to every domain of the computing system 10. Rules can be either synchronous or asynchronous. Synchronous rule processing means that a workflow is paused when a transaction in the system 10 awaits rule execution. Asynchronous rule processing means that rule actions are carried out without pausing further execution of other actions or other rules. Batch rule updating, asynchronous rule actions (pertaining to email and logging, for example), and the ability of the system 10 to continue operation following the removal of a rule are further preferred.

Figure 24:
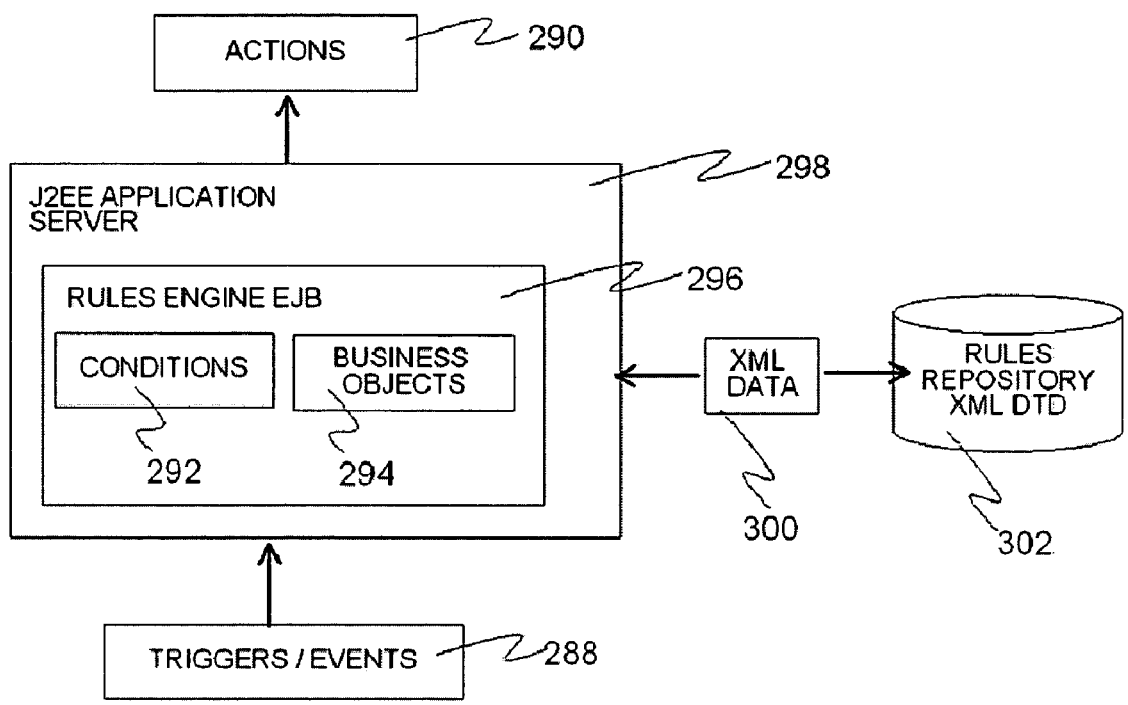
FIG. 24 is a software architecture view of a rules engine according to one embodiment of the present invention.

Turning now to FIG. 24, an architecture view of the rules engine component 86 is shown. According to one embodiment of the rules engine component 86, a rule includes events or triggers 288, actions 290, conditions 292, and business objects 294. Events 288 are the circumstances that need to be met in order to request a rule set evaluation from the rules engine component 86. Actions 290 are the reactions taken depending on the result of a rule evaluation. Conditions 282 are the questions answered during the rule evaluation, and business objects 294 are the items that are being accessed in conditions and actions. In the embodiment shown in FIG. 24, conditions 292 and business objects 294 reside in a rules engine EJB 296 on a Java 2 Platform, Enterprise Edition (J2EE) application server 298. The rules engine EJB 296 communicates using XML data 300 with a rules repository 302, using XML DTDs.

One implementation of the rules engine component 86 is the automation of digital goods submission workflows within the computing system 10. Complex rules can easily be added to automate a number of workflows within the computing system 10. Rules may be implemented at different levels of the computing system 10. For example, some rules may apply to an entire system, while other rules may apply only to smaller domains within a particular deployment. According to one embodiment of the computing system 10, the rules engine component 86 is made accessible to end-users such that end-users may be allowed to develop rules for business logic or for interactions with their devices that are particular to their individual needs. Further, in one embodiment of the computing system 10, the rules engine component 86 allows rules to be "hot-swappable," such that adding new rules or changing existing rules does not require the entire system to be reset.

Within the rules engine component 86, administrators are given the opportunity to define scopes of contexts for the implementation of rules. This guards against rules becoming obsolete by incorporating the ability to alter context definitions over time. For example, memory capabilities of mobile devices may change over time. Thus, while at one time less sixteen megabytes of memory may be considered a small amount of memory and a device having more than sixteen megabytes of memory would be considered to fall within a "high memory" context for mobile devices, at a later time it may be more useful to classify devices having up to 128 MB of memory within a "low memory" group and to group devices having more than 128 MB of memory into a "high memory" group. Thus, allowing the definition of context scopes to change over time ensures that rules implemented in the computing system 10 will not grow obsolete with advances in computing technology.

Configuration Component

The configuration component 84 resides in the business logic layer 48 and provides generic management of configuration data for all parts of the computing system 10, including EJB components, servlets, and standalone applications. The configuration component 84 thus allows for fine-tuning of a deployment of the computing system 10 for optimum performance. According to one embodiment, the configuration component 84 is an EJB itself and provides a generic system configured via XML for managing configuration data. Further, the configuration component 84 may be implemented using managed Java beans, allowing for integration with Java Management Extensions.

Certain embodiments of the present invention have specific requirements for the configuration component 84. According to one embodiment of the computing system 10, required configuration information is retrieved from a primary database upon startup to initialize the system. Further, it is preferred to have default values for all configuration items to enable easy startup of the system 10. Configuration data is preferably represented using XML, and an XML DTD describing configuration data formatting may be used. Further, it is preferred for the configuration component 84 to validate its XML DTD each time it is initialized, because the DTD may change over time. It is also preferred for the configuration component 84 to be one of the first components of the computing system to start, as other components of the computing system 10 may be provided with dependencies on the configuration component 84.

According to one embodiment of the computing system 10, configuration information is handled using a distributed approach, because components resident on different devices will require access to configuration data 150 (shown in FIG. 11). According to some embodiments of the present invention, the configuration management component 84 is required to dynamically configure applications at runtime. An example of this is an application loading database connection parameters during startup of the computing system 10. These configurable parameters are typically stored in configuration files or a database and can be managed through a user interface. More advanced configuration management schemes may use expiry timeouts (through polling) and update events to allow for "hot" updates of configuration parameters in applications without the need for restarts.

Another aspect of configuration management relates to the propagation of updates throughout the computing system 10. According to one embodiment of the present invention, applications on the computing system 10 receive notifications of updates as they are submitted to the system 10. Using this updating system, the computing system 10 uses Java Messaging Service (JMS) topics to publish update notifications to system users. Application components that require update notifications as they happen can register as subscribers to these notification topics to receive updates as they happen. These components then implement the code to react to changes as required.

According to one embodiment of the configuration component 84, configuration data is described using the standard Java data types (e.g., String, Integer, Double, Date, etc.). Configuration parameters are commonly referenced using a unique name within the context, e.g., a properties file. This commonality allows for a generic data management scheme to be easily developed. XML templates can define the meta information for a configuration context. This template would define the parameters to manage, referenced by a name unique to the context. According to one embodiment, the data type is specified (String, Integer, etc.) for each parameter, along with default values, data restrictions such as ranges, enumerated lists, and the like. Other configuration information may include expiry time intervals and "hot" update queue information. User interfaces can use a template to generate the management user interface on the fly, as required. The configuration component 86 may further use a template to validate configuration data updates.

Client applications accessing the configuration component EJB may include several types of applications, such as EJB components or web clients. The configuration component EJB may be used by configuration client applications to manage the configuration data.

Configuration parameters are utilized within the computing system using configuration parameter definition objects. A configuration parameter definition object defines the name and type of the configuration parameter, along with any additional data restriction information. Configuration parameters are applied within certain "contexts" of devices within the computing system 10. Contexts may include a variety of types of information about devices within the computing system, such as device types, named users of the devices, device location, device capabilities, information about devices, data, and applications to which a particular device has access, information about connection bandwidth available to a device, information about network type (such as wireless versus wire line networks), information on whether a user has a device while travelling or while at a particular event, and a variety of other types of information about a device or user. Types of information that may be included in a configuration parameter definition object may include: the name of the parameter, a descriptive label for the parameter, the data type for the parameter, minimum and maximum values for parameters, information on whether a value can be nulled, security role information (for determining what roles are allowed to manipulate the value), scope information (describing whether the configuration parameter is global or specific to a domain, or specific to a physical server machine), and a default value for the parameter.

Certain contexts can be given configuration sets termed "configuration contexts." Examples of configuration contexts include context information such as maximum transfer size of digital goods, and maximum binary sizes for digital goods, defining the amount of room that is available on a device for receiving a digital good or the amount of bandwidth that is available. Thus, configuration parameters may be segregated by context, while having the same name. For example, two different EJB components may define a parameter called "timeout." By defining a configuration context for each component, the parameters are unique to each context. Examples of information which may be included within a particular configuration context include the name of the configuration context, a description of the configuration context, a list of configuration parameter definition objects, and any message topic or queue information allowing users to receive notifications when parameter values change in the context. Parameters across different contexts may be grouped using functional grouping objects, which include descriptive labels, descriptions, and references to configuration parameter definition objects that are being grouped. According to one embodiment, configuration contexts can be defined separately for separate domains of a single deployment of the computing system 10.

The configuration component 48 is preferably managed using a web-based interface which allows a number of functions to be performed by an administrator. Using the configuration interface, it is preferred to allow administrators to: find configuration parameter values using logical key sets (including context names, parameter names, domain IDs, and server IDs); find configuration parameter values using physical keys (including information on parameter value locations); retrieve all configuration parameter values by context names and domain IDs; insert new configuration parameter values; delete configuration parameters; issue update events on specified event queues when parameters are inserted and updated; retrieve, insert, update, and delete configuration contexts and their associated configuration parameter definitions using XML representations; manage configuration parameters using XML representations; and create, edit, and find functional grouping objects in addition to finding all configuration parameter definition objects referenced by a grouping.

Operational Measurement Component

The operational measurement component 82 allows developers and administrators to monitor and tune the computing system 10, and provides the data necessary to determine where performance bottlenecks are and how applications can be tuned to best suit particular deployments of the computing system 10. According to one embodiment of the computing system 10, the operational measurement component 82 provides real-time information about the performance and statistics of the computing system 10. Operational measurement in the present invention may be performed in a number of ways, including exposing methods to management software allowing for real-time querying of specified measurements and writing measurement values to persistent storage as they change. According to one embodiment of the present invention, measurement values are written to persistent storage as they change, with management software then querying the data store to get "snapshots" of the measurements being tracked, as necessary. Reporting tools which import data and provide meaningful presentations of operational measurements may be utilized with the operational measurement component 82.

Data throughput, connection statistics, message statistics, and resource usage are among the operational measurements recorded by the operational measurement component 82. It is preferred to allow system operators and administrators to configure which operational measurements are tracked. According to one embodiment of the operational measurement component 82, operational measurement data 148 is forwarded to the database 66 on a regular basis. In one embodiment of the computing system 10, operational measurement snapshots are recorded once every ten seconds, though shorter or longer time values may be implemented in particular deployments of the computing system 10. It is preferred for operational measurement data to be collected using a schema that is exposed via an API to allow third-party tools to mine the operational measurement data 148 and generate reports based on the data.

According to one embodiment of the operational measurement component 82, three subcomponents interact within the operational measurement component 82. The first of the three sub-components, an operational measurement EJB, provides interfaces to retrieve and set measurements. The second subcomponent, an operational measurement methods-driven EJB, provides the management to accept JMS messages that contain updates to measurements. The third subcomponent, an operational measurement managed bean (MBean) provides the interface to standard Java Management Extensions (JMX) agents and managers to enable access to and manipulation of measurement data. This design allows components to quickly issue updates in an asynchronous fashion while allowing processing of the updates to happen in a low-priority manner, helping to reduce the resource impact of the operational measurement component 82.

Administration Component

The administration component 78 is preferably implemented as a distributed component through the interaction of other components, such as the device management component 76, the operational measurement component 82, the configuration component 84, the rules engine 86, and the catalog component 90. The administration component 78 may be implemented using a web-based interface, enabling administrators to maintain users, devices, warehouses, catalogs, and rules and to send messages to users using the other components of the computing system 10. According to one embodiment of the computing system 10, both administrators and system operators have access to the functions enabled by the administration component 78.

Figure 25:
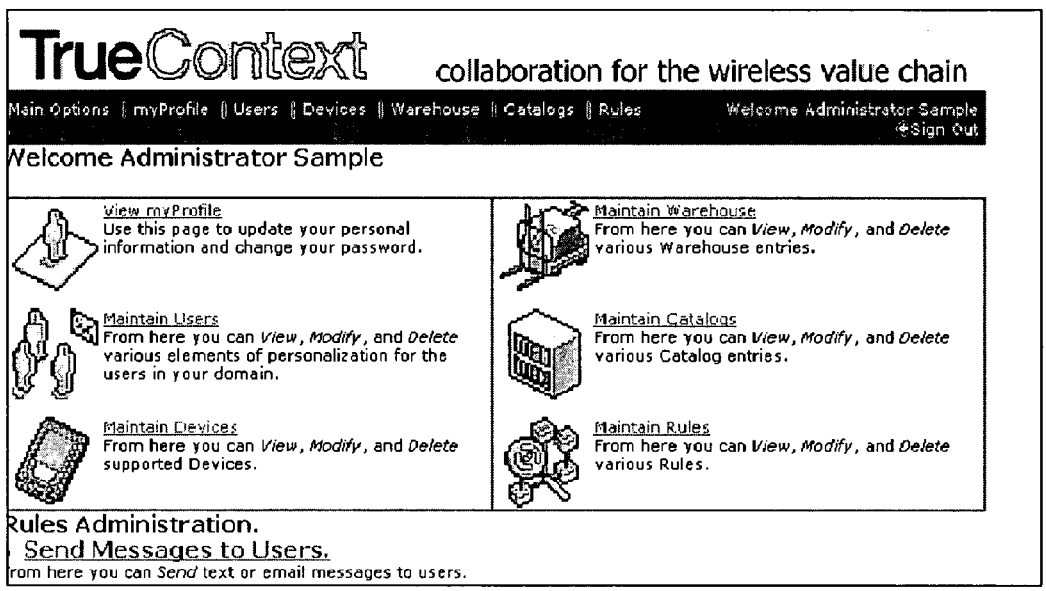
FIG. 25 is a screen view of an administrator home page according to one embodiment of the present invention.
Figure 26:
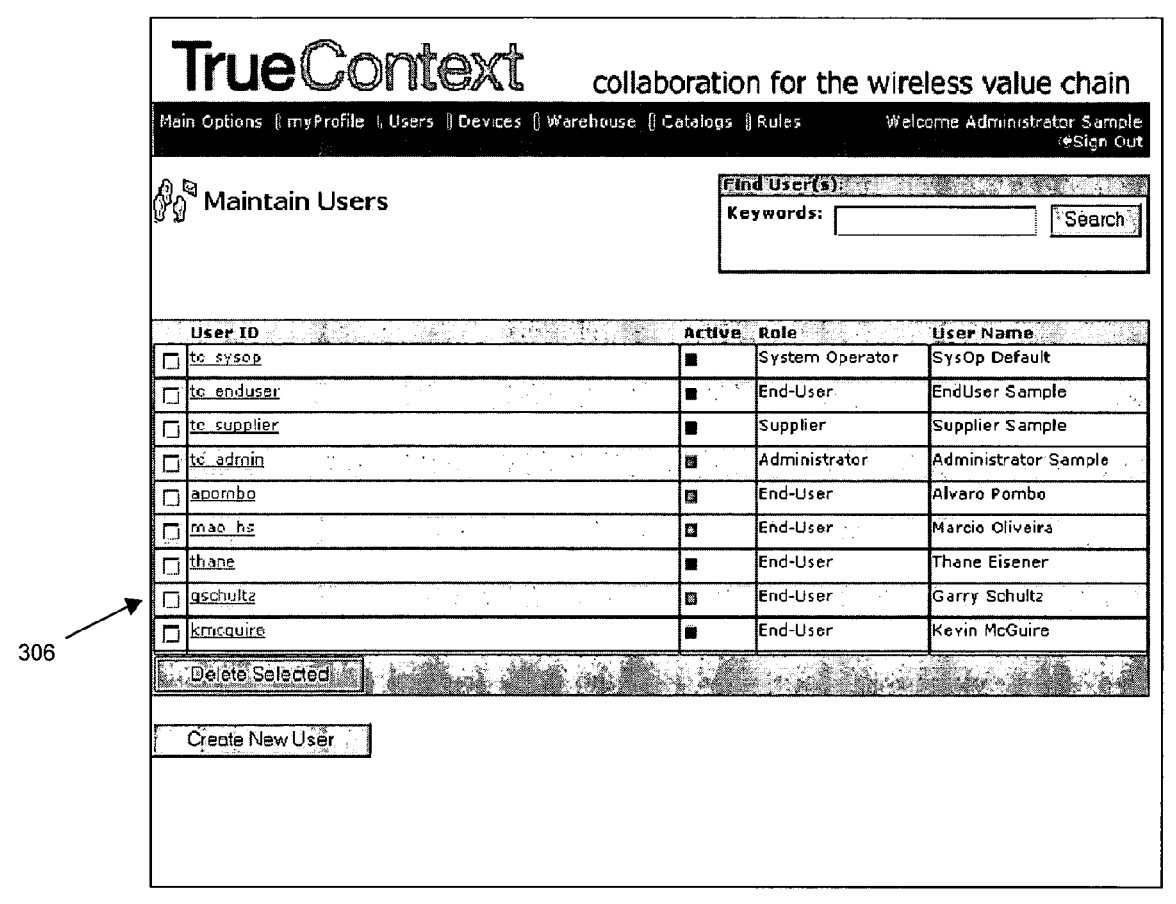

FIG. 25 is a screen shot of an administrator home page 304 from which an administrator may access options such as: viewing the administrator profile (where personal information and passwords can be changed), maintaining users (including creating and maintaining user groups), maintaining devices, maintaining warehouses, maintaining catalogs, and maintaining rules. To maintain users, an administrator accesses a user list page 306 as shown in FIG. 26. The user list page 306 shows user IDs, whether or not the user is active, the users' roles within the computing system 10, and the user names. To modify a user's settings, an administrator selects a name from the user list page 306 to access a user profile page 308, shown in FIG. 27. The user profile page 308 allows an administrator to access and alter user information, including personal information and information about users' devices. Information on the user's role within the computing system may also be entered into a user's profile. Additional interface pages may be provided to allow an administrator to add new users, (including specifying users' roles), delete users from the computing system, add new devices, and delete supported devices.

Figure 29:
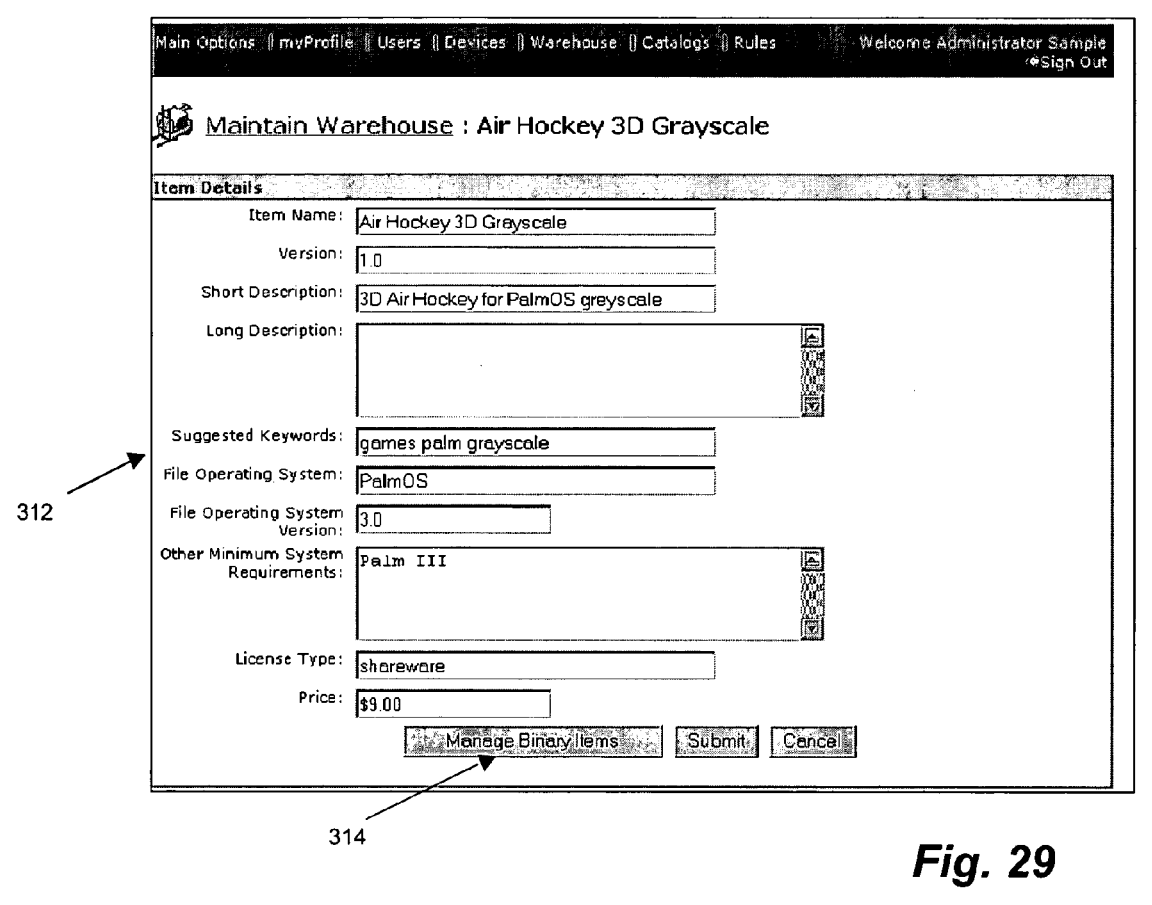

Warehouse and catalog maintenance are also enabled by the administration component. The warehouse maintenance function allows administrators and operators to validate new warehouse items and manage items within warehouses. FIG. 28 is a screen shot of a warehouse maintenance page 310, where an administrator can view warehouse items, create new items, delete items, and view comments associated with items. The warehouse maintenance page 310 includes item information such as names of items, version numbers of items, the number of binaries associates with items, item sizes, and the last date on which items were updated. To view and edit a warehouse item, an administrator selects an item from the warehouse maintenance page 310 to access a warehouse item details page 312, as shown in FIG. 29.

The warehouse item details page 312 allows an administrator to view an item in detail and specify item information. In addition to viewing and updating item names and version numbers, administrators can add descriptions of items, provide suggested keywords to associate with items, specify operating system and operating system version numbers for items, define minimum system requirements, and insert information on license types and prices for items using the warehouse item details page 312. The administrator may also manage binary items by accessing the "manage binary items" function of the warehouse item details page 312. Managing binary item types may similarly be performed using a web-based interface into which an administrator enters information such as binary system requirements, binary license types, and the like. Similar web-based interface pages may be provided for creating new warehouse items, deleting warehouse items, and maintaining catalogs (including creating new catalogs, adding items to catalogs, viewing catalogs and catalog items, modifying catalog properties, and deleting catalogs and catalog items).

Personalization Component

According to one embodiment of the computing system 10, the personalization component 80 includes a set of subcomponents used to collect users' information and tailor the user experience according to implicit and explicit profiles. End-users 18, system operators 24, application developers 26, and administrators 28 may employ the personalization component 80 to enhance the experience of using the computing system 10. According to one embodiment of the personalization component 80, the component is implemented using EJBs, with an authentication manager being responsible for processing login requests and checking user privileges and a user manager being responsible for retrieval, updating, insertion, and deletion of user information.

Figure 30:
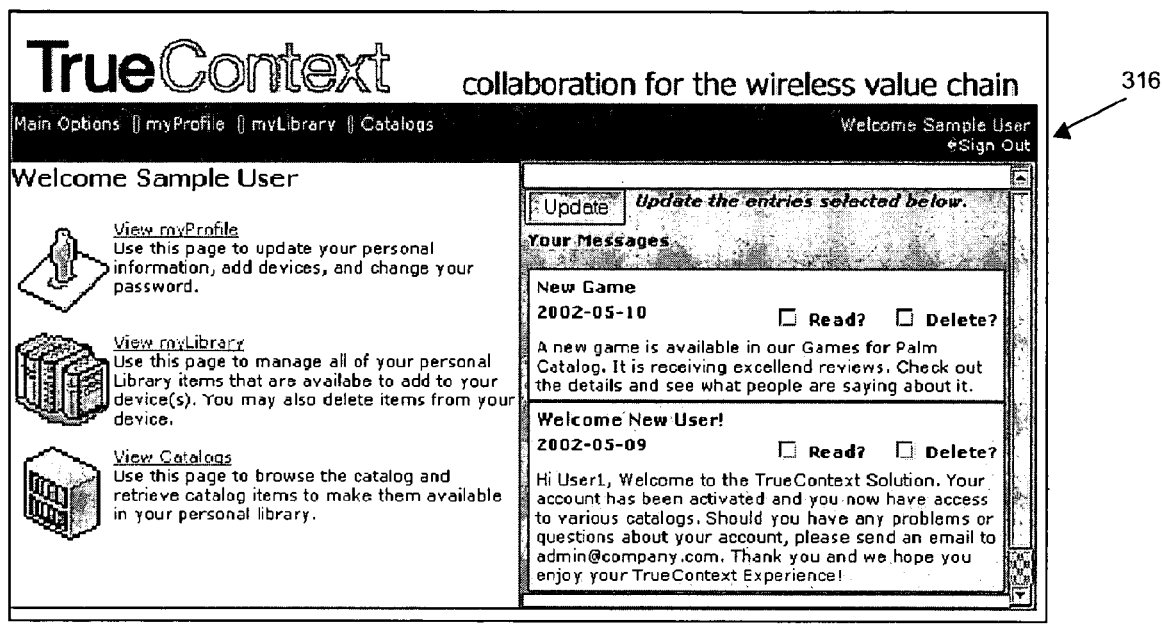
FIG. 30 is a screen view of an end-user home page according to one embodiment of the present invention.

Personalization may be enhanced through a user interface similar to the interface used in the administration component 78. For example, end-users 18 may access a home page 316, as shown in FIG. 30. The home page serves as an initial page from which an end-user may select options including accessing the use's profile, accessing the user's library, and viewing catalogs that are available to the user. If users wish to review or edit profile information, they access a profile page 318 as shown in FIG. 31. The profile page 318 allows the user to update personal information as well as information on which devices the user has. The profile page 318 may be used to add new email addresses and devices to a user profile.

User libraries serve as end-users' personal repositories of items they have downloaded from catalogs. Users may customize their libraries using a library page from which users may view items within their libraries (including items details such as item sizes and requirements), add and delete items to and from their libraries, and view and submit item comments.

Users may also use a web-based interface for viewing catalogs, where users may access digital goods that particularly appeal to them. For example, if an end-user is interested in games produced especially for the Palm OS, the user may browse through a "Palm Games" catalog to find particularly appealing games. Using a catalog interface, users can acquire items from catalogs and add them to their own libraries, for example by purchasing the items and gaining sufficient authorization to install the items in their libraries. Users may also use the catalog interface to review and add comments and ratings for catalog items.

The personalization component 80 may be further adapted to provide more thorough personalization of a user's experience. For example, personalization may extend to allowing a user to implement favorite user interfaces or appearances for data on users' devices. The personalization component 80 may further include the ability for a user to use messaging capabilities of the computing system 10. Messaging may be implemented from a user's home page 316, and the users or user groups to which individuals may direct emails may be controlled by a system operator or administrator.

Another feature of the computing system 10 which may be implemented using the personalization component 80 is an implicit profiling feature. In implicit profiling, a user's activities within the computing system 10 are used to add information to a user profile. Thus, a user profile may be built based on a user's interaction with the computing system 10 without requiring the user to make direct profile choices. For example, a particular user may access the computing system 10 several times to find out information about games and to acquire digital goods related to games. This user would be implicitly profiled as a user focused on games, and this information can be used in targeted advertising to the user by concentrating on game advertisements.

Client Stub Component and Sync Engine

The client stub component 130 acquires required device information through device OS APIs and creates and updates databases on devices. According to one embodiment of the computing system 10, the client stub serves as the interface between an end-user device and other components of the computing system 10. According to one embodiment of the computing system 10, the client stub component 130 activates automatically upon any synchronization between an end-user device and the computing system 10. Alternatively, the client stub component may be started manually by an end-user during a synchronization event. The client stub component 130 works with other components, including the device management component 76 and the operational measurement component 82 to integrate device information into the computing system 10. According to one embodiment, the databases on the devices store unique computing system device IDs along with metrics acquired by the stub from the device. The client stub component 130 may be launched by a conduit, which acquires attributes and values from the device database. Information acquired by the client stub component 130 may include unique device IDs, battery types, and the percentage and amount of power remaining in the device battery. The client stub may alternatively be implemented without the need for a conduit, where devices have the capability for communication with other components of the computing system 10 without an intermediate conduit.

The client stub component 130 further enables context-based forwarding of information to user devices, such that information may be tailored to specific contexts for specific users. For example, if a user's context indicates that the user is in the office, the client stub component 130 can record and forward this information to other components in the computing system 10, allowing the other components to provide information to the device that is particularly pertinent to the office environment. This functionality allows limited device memory and other resources to be dedicated to relevant tasks, rather than burdening devices with unnecessary information at inopportune times.

Figure 32:
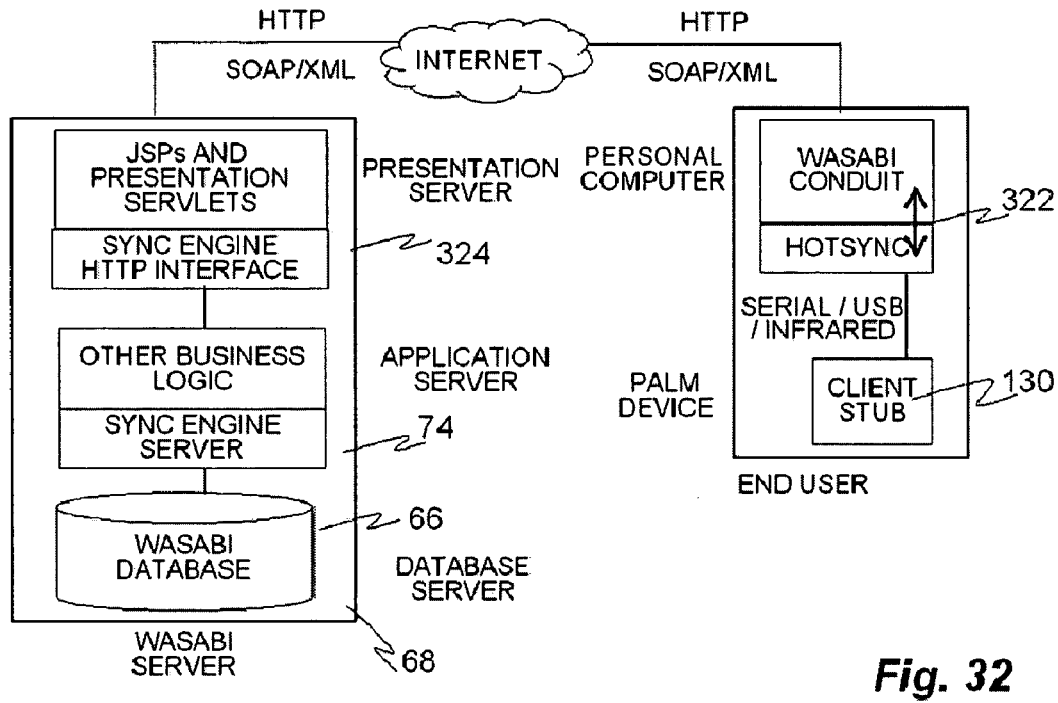
FIG. 32 is an architectural overview showing communication between components according to one embodiment of the present invention.

FIG. 32 shows the client stub component 130 resident on a user's handheld device. According to one embodiment of the invention, the client stub communicates with a personal computer using a conduit 322, which, in turn, communicates over the Internet 56 with a presentation server 324. Alternatively, the conduit may be omitted, allowing direct communication between the Internet 56 and the client stub. The presentation server 324 and the HTTP server component 116 may be implemented on a single physical server. The presentation server 324 has access to the application server component 74, which, in turn, has access to the database 66 via the database server component 68. Through this series of communication links, the client stub component 130 enables syncing of a device with the computing system 10. According to one embodiment of the computing system 10, communication with the sync engine is done via the HTTP server component 116.

Device syncing in the computing system may be accomplished through the use of a sync engine. According to one embodiment of the present invention, a sync engine contains two layers: a servlet, seated on the presentation layer 50 and an EJB seated at the application server component 74 and interacting with other system components, including the device management component 76. According to one embodiment of the computing system 10, Hypertext Transfer Protocol over Secure Socket Layer, or HTTPS, is utilized for system security, while still retaining the ability to use SSL via HTTP.

HTTP Server, View Controllers, and Stylesheets Components

The HTTP server component 116 serves as a central component for allowing web-based access to the other system components. The HTTP server component supports the presentation layer 50. It is preferred for the HTTP server component 116 to support Java Server Pages and to provide a servlet container. Further, it is preferred for the HTTP component 116 to be HTTP/1.1 compliant and to support advanced optimization features such as static data cashing. For security purposes, it is preferred for the HTTP server component 116 to support 128 bit encryption over the Secure Sockets Layer (SSL), and to have a certificate with a key installed. It is further preferred for the HTTP server component 116 not to have direct access to the database 66, to prevent the possibility of unauthorized database access by hackers. According to one embodiment of the computing system 10, the HTTP server component 116 works in conjunction with the view controllers component 128 and the stylesheets component 126 to support the presentation layer 50.

These components work together to enable the retrieval of data from databases and to provide data in a form available to any view type. According to one embodiment of the computing system 10, JSPs are used to reference data from Java Beans as needed. An XML document may be used to control the flow of the interface, and the XML document may be altered without recompiling and without restarting the computing system 10. Such an implementation allows for action handlers which act before and after data transfer events, allowing data validation to happen on Java Beans. Action handlers may be used to define which pages are accessed, while the XML page defines how to access individual pages. Using this methodology, components dealing with data presentation in the computing system 10 may be kept physically separate from components dealing with the storage and access to physical data files.

System Deployments

Figure 33:
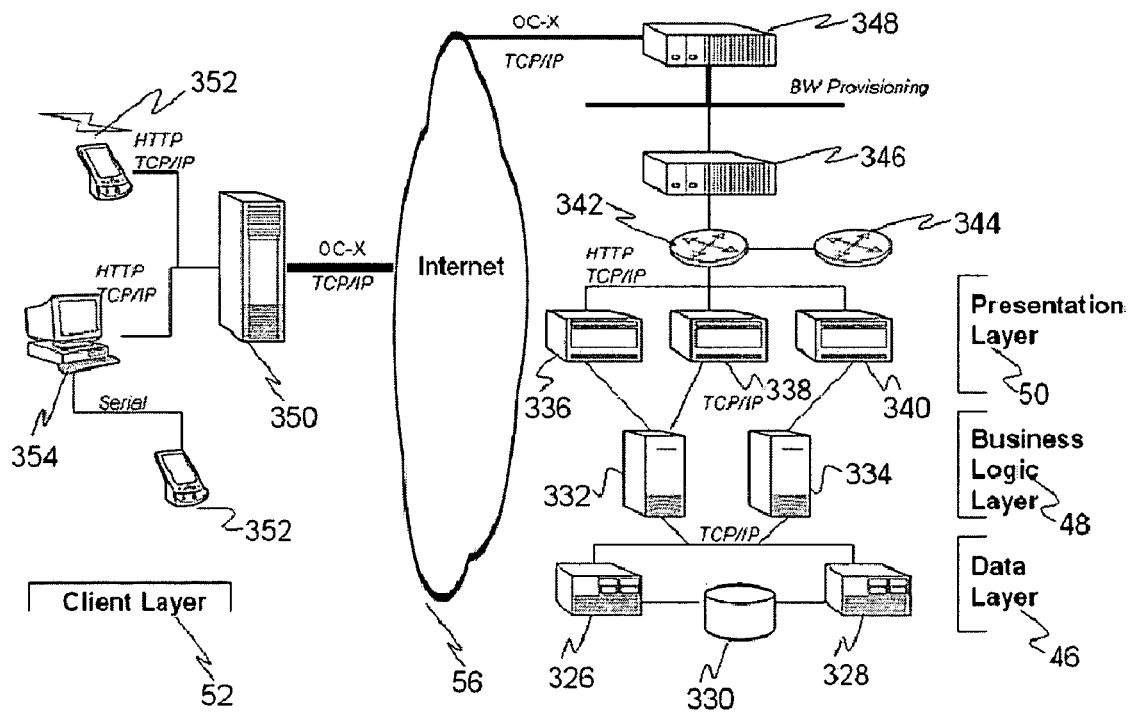
FIG. 33 is an architectural view of a general IT deployment according to one embodiment of the present invention.

The computing system 10 of the present invention is scalable for optimum resource allocation in a number of types of deployments. Deployments may be specialized for enterprises, telecommunications carriers, general information technology locations (such as central offices or corporate laboratories), and for a wide variety of other entities requiring a comprehensive communications solution. According to one embodiment of the computing system 10, the system is deployed such that different legal entities or enterprises have their digital goods stored in physically distributed locations, reducing the likelihood of improper access to proprietary digital goods. FIG. 33 shows an architecture view of a general IT deployment of the computing system 10 according to one embodiment of the present invention. The data layer 46 is implemented via a data server 326, a mirror data server 328, and a database cluster 330. The business logic layer 48 is implemented using two application servers 332 and 334. The presentation layer 50 is implemented using three HTTP servers 336, 338, and 340, along with a primary load balancer/firewall 342 and a fail-over load balancer/firewall 344. Communication between the presentation layer 50 and the client layer 52 takes place over the Internet 56, using first and second switches 346 and 348 on the presentation layer side, and an ISP gateway 350 on the client side. As shown in FIG. 33, communication between a mobile device 352 may take place wirelessly or via wire line communication directly between the ISP gateway and the mobile devices 352, or via wireless or wire line communication wherein a mobile device 352 is further connected to a personal computer. The deployment of FIG. 33 is an example deployment, and it is to be understood that the hardware supporting the data layer 46, the business logic layer 48, and the presentation layer 50 may take a variety of forms, including all three layers being supported on a single server, each layer being supported on a separate server, and combinations of two layers on one server and a third layer on a second server.

System Functions and Facilitators

A number of functions and features may be incorporated into the computing system 10 to increase the ease of use and functionality of the system for all actors.

Community grouping is one feature that enhances the usability of the computing system 10 by allowing administrators and system operators to group system actors, allowing administration, maintenance, and operations to be carried out more efficiently on a larger scale rather than addressing individual users for all cases. Community grouping may be implemented by using an EJB server layer along with appropriate interfaces. Examples of community groups include groups for pushing a digital good or message to a set of end-users, groups for allowing a set of end-users to access particular catalogs, groups for allowing a set of administrators and end-users to receive group emails, and groups to allow a set of administrators to maintain a catalog or restrict maintenance abilities to the ability to add items, rather than the ability to delete or modify items.

Messaging allows users, including administrators and system operators, to send messages to other users. Messaging may be useful, for example, when an administrator wishes to send an update message to users regarding new catalogs available to them or to alert them of viruses or upgraded operating systems. Messaging may be implemented through a web-based interface with a messaging page 326 allowing a user to edit a message and specify recipients, as shown in FIG. 33. Messaging may be tracked through the use of message fields, including information on message type, message priority, information on whether and when the message was accessed and read, and information on whether a message has been deleted. Messaging may be implemented as a "push" function in the computing system 10.

A dictionary mechanism may also be employed in the computing system 10. A dictionary is useful because each system object, such as a warehouse item or catalog item, has multiple attributes associated with it. Some of these attributes may only have a constrained number of possible values (for example, the OS type of a warehouse item may be limited to Palm OS, Windows PocketPC OS, Symbian, RIM OS, and others). In order to effectively and flexibly manage the possible attribute values, the dictionary serves as a centralized mechanism to capture attributes and their associated constrained list of values. A data dictionary allows an administrator to have full control over item attribute values and enables the addition, deletion, and modification of values when necessary. The dictionary may be implemented as an EJB in the business logic layer 48.

Security within the computing system 10 may be handled using a Role-Based Access Control (RBAC) system. In the RBAC system, users are assigned to roles, and access permissions are assigned to particular roles. Users acquire permissions by belonging to roles. According to one embodiment of the computer system 10, users can belong to any of four roles: end-users, application developers, administrators, and system operators. These roles may be considered "master roles," with administrators having the option to develop other roles within the master roles. RBAC is implemented so that users only have access to those computer system items that the user is entitled to, and RBAC works in combination with the system components described above to allow access only where entitlement has been purchased or given by administrators or system operators. Actors within the computing system 10 who have been verified as proper users of the system may be considered "trusted" actors as part of a trusted chain of supply, while actors who have not been verified as proper users may be considered "untrusted" actors as part of an untrusted chain of supply.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A computing system for specifying and managing chains of supply of digital content from a plurality of producers to a multiplicity of end-user devices over a plurality of types of network connections comprising:
    at least one warehouse containing a plurality of digital content generated by said producers;
    an application server for managing a synchronization event;
    a configuration component to manage one or more configuration data for said computing system and one or more of said contexts for an end-user device, said contexts including a collection of configuration data specific to an end-user device for each of said types of network connections;
    a rules engine for triggering one or more actions in response to said synchronization event based on a set of rules and configuration data and said contexts; and
    an administrators module for configuring said computing system and managing access to said data warehouses by said end-user devices.

2. The computing system of claim 1 wherein said action includes presenting said digital content from said data warehouse onto said end-user device.

3. The computing system of claim 1 wherein said action includes publishing said digital content from said end-user onto said data warehouses.

4. The computing system of claim 1 wherein said action includes sending notifications to said end-user devices.

5. The computing system of claim 1 wherein said action includes removing said digital content on said end-user device with said digital content on said data warehouse.

6. The computing system of claim 1 wherein said action includes synchronizing said digital content on said end-user device with said digital content on said data warehouse.

7. The computing system of claim 1 further comprising a catalogue component for creating one or more catalogue views of said digital data stored in said data warehouse and wherein said action includes presenting one or more of said catalogue views to the end-user device.

8. The computing system of claim 7 wherein said catalogue component is used for rating and commenting on said digital content stored in said one or more data warehouses.

9. The computing system of claim 1 further comprising a personalization component for manually or explicitly customizing the experience and view of the digital content.

10. The computing system of claim 1 wherein said administrators module logically partitions said end-user devices and said digital content into one or more domains for the purposes of security and administrative assignment and responsibility.

11. The system of claim 10 wherein said billing system bills end-users based on usage of services, including backup and restore functions provided by the system to each end-user.

12. The system of claim 1 which includes means for said one or more administrators to interrogate said end-user devices to determine resident operating systems, hardware details, and information regarding applications resident on said end-user devices.

13. The system of claim 1 further comprising a device management module determining the operating systems, hardware details, and information regarding applications located on said end-user devices.

14. The system of claim 1 further comprising a billing system to bill end-users based on the selection of digital content by end-users devices.

15. The system of claim 14 wherein said billing system is external to said computing system.

16. The system of claim 1 further comprising an operational measurements component for logging system events.

17. The system of claim 1 further comprising an operational measurement component for reporting usage of said computing system and said digital content.

18. The system of claim 1 which includes means for pushing selected digital content directly to selected end-user devices.

19. A method of using a computing system for specifying and managing chains of supply of digital content from a plurality of producers to a multiplicity of end-user devices over a plurality of types of network connections, comprising:
provinding one or more data warehouses containing a plurality of digital content generated by said producers;
managing one or more of contexts for an end-user device, said contexts including a set of configuration data specific to an end-user device for each of said types of network connections;
detecting a synchronization event between at least one of said data warehouses and at least one of said end-user devices;
triggering at least one action in response to said synchronization event based on a set of rules and said context; and
configuring said computing system and managing access to said data warehouses by said end-user devices, by one or more administrators.

20. The method of claim 19 wherein said action includes presenting said digital content from said data warehouse onto said end-user device.

21. The method of claim 19, wherein said action includes publishing said digital content from said end-user onto said data warehouses.

22. The method of claim 19 wherein said action includes sending notifications to said end-user devices.

23. The method of claim 19 wherein said action includes removing said digital content on said end-user device with said digital content on said data warehouse.

24. The method of claim 19 wherein said action includes synchronizing said digital content on said end-user device with said digital content on said data warehouse.

25. The method of claim 19 which includes creating one or more catalogue views of said digital data stored in said data warehouse and wherein said action includes presenting one or more of said catalogue views to the end-user device.

26. The method of claim 19 which includes rating and commenting on said digital content stored in said one or more data warehouses.

27. The method of claim 19 which includes manually or explicitly customizing the experience and view of the digital content.

28. The method of claim 19 which includes logically partitioning said end-user devices and said digital content into one or more domains for the purposes of security and administrative assignment and responsibility.

29. The method of claim 19 which includes interrogating said end-user devices to determine resident operating systems, hardware details, and information regarding applications resident on said end-user devices.

30. The method of claim 19 which includes determining the operating systems, hardware details, and information regarding applications located on said end-user devices.

31. The method of claim 19 which includes billing end-users based on the selection of digital content by end-users devices.

32. The method of claim 19 which includes billing end-users based on usage of services, including backup and restore functions provided by the system to each end-user.

33. The method of claim 19 which includes logging system events.

34. The method of claim 19 which includes reporting usage of said computing system and said digital content.

35. The method of claim 19 which includes pushing selected digital content directly to selected end-user devices.

* * * * *

UNITED STATES PATENT AND TRADEMARK OFFICE
CERTIFICATE OF CORRECTION

| | |
|---|---|
| PATENT NO. | : 7,930,215 B2 |
| APPLICATION NO. | : 10/631623 |
| DATED | : April 19, 2011 |
| INVENTOR(S) | : Alvaro Pombo et al. |

It is certified that error appears in the above-identified patent and that said Letters Patent is hereby corrected as shown below:

Column 30, Claim 1, Line 40 replace the text "more of said contexts for an end-user device, said con-" with "more contexts for an end user device, said con-".

Signed and Sealed this
Twenty-fifth Day of October, 2011

David J. Kappos
*Director of the United States Patent and Trademark Office*